US009668146B2

(12) United States Patent
Lau

(10) Patent No.: US 9,668,146 B2
(45) Date of Patent: May 30, 2017

(54) AUTONOMOUS ROBOT-ASSISTED INDOOR WIRELESS COVERAGE CHARACTERIZATION PLATFORM

(71) Applicant: The Hong Kong University of Science and Technology, Kowloon (HK)

(72) Inventor: Vincent Kin Nang Lau, New Territories (HK)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 67 days.

(21) Appl. No.: 14/694,983

(22) Filed: Apr. 23, 2015

(65) Prior Publication Data

US 2015/0312774 A1   Oct. 29, 2015

Related U.S. Application Data

(60) Provisional application No. 61/995,942, filed on Apr. 25, 2014.

(51) Int. Cl.
*H04W 24/10*   (2009.01)
*H04W 64/00*   (2009.01)
(Continued)

(52) U.S. Cl.
CPC .......... *H04W 16/20* (2013.01); *G05D 1/0274* (2013.01); *G05D 1/102* (2013.01);
(Continued)

(58) Field of Classification Search
CPC ... H04M 2250/12; H04W 4/02; H04W 16/20; H04W 24/10; H04W 4/04; H04W 4/046;
(Continued)

(56) References Cited

U.S. PATENT DOCUMENTS 7,076,252 B1   7/2006   Hirvonen
7,764,653 B2   7/2010   Marinier
(Continued)

FOREIGN PATENT DOCUMENTS

CN   102740336 A   10/2012
CN   202679644 U   1/2013
(Continued)

OTHER PUBLICATIONS

Claussen et al., "Self-optimization of femtocell coverage to minimize the increase in core network mobility signalling", Bell Labs Technical Journal 14(2), 155-184 (2009) Alcatel-Lucent, 29 pages.
(Continued)

*Primary Examiner* — George Eng
*Assistant Examiner* — Umair Ahsan
(74) *Attorney, Agent, or Firm* — Amin, Turocy & Watson, LLP

(57) ABSTRACT

A wireless coverage characterization platform uses an autonomous vehicle or robot, such as an unmanned aerial vehicle or other small robot, to autonomously collect key wireless coverage parameters for an indoor environment. One or more vehicles or robots are equipped with integrated simultaneous localization and mapping sensors as well as wireless signal measurement sensors. As a vehicle traverses the indoor environment, on-board processing components process the sensor measurement data to simultaneously build an indoor map of the environment and to learn the wireless coverage characteristics of the environment incrementally. The vehicle's navigation system guides the vehicle through the environment based on the sensor measurements and the learned indoor map until a complete map of the wireless signal strength at all locations throughout the environment is obtained. The system can identify areas of weak wireless coverage or interference sources and recommend access point device locations based on results of the survey.

20 Claims, 13 Drawing Sheets

(51) Int. Cl.
| | |
|---|---|
| *H04W 4/04* | (2009.01) |
| *G05D 1/02* | (2006.01) |
| *H04W 16/20* | (2009.01) |
| *H04L 29/08* | (2006.01) |
| *G05D 1/10* | (2006.01) |
| *H04W 4/00* | (2009.01) |

(52) U.S. Cl.
CPC ............ *H04L 67/12* (2013.01); *H04W 4/046* (2013.01); *H04W 24/10* (2013.01); *H04W 64/003* (2013.01); *G05D 2201/0207* (2013.01); *H04W 4/008* (2013.01)

(58) Field of Classification Search
CPC ... H04W 64/003; G01S 17/89; G05D 1/0242; G05D 1/027; G05D 1/0274; G05D 1/028; G05D 2201/0207; G05D 1/0088; H04L 67/12
See application file for complete search history.

(56) References Cited

U.S. PATENT DOCUMENTS

| | | | | |
|---|---|---|---|---|
| 8,594,674 | B2 | 11/2013 | Jung et al. | |
| 9,173,067 | B2* | 10/2015 | Aggarwal | H04W 4/04 |
| 9,216,508 | B2* | 12/2015 | Ruuspakka | B25J 9/1664 |
| 2004/0143428 | A1* | 7/2004 | Rappaport | G06F 17/509 |
| | | | | 703/22 |
| 2007/0271011 | A1* | 11/2007 | Lee | G05D 1/0242 |
| | | | | 700/245 |
| 2007/0276540 | A1* | 11/2007 | Okuda | G05D 1/0272 |
| | | | | 700/245 |
| 2008/0280565 | A1* | 11/2008 | Jevremovic | H04W 16/20 |
| | | | | 455/67.7 |
| 2013/0196684 | A1* | 8/2013 | Dong | H04W 4/04 |
| | | | | 455/456.1 |
| 2013/0320212 | A1* | 12/2013 | Valentino | G01J 1/0488 |
| | | | | 250/336.1 |
| 2014/0207282 | A1* | 7/2014 | Angle | H04L 12/282 |
| | | | | 700/257 |

FOREIGN PATENT DOCUMENTS

| | | |
|---|---|---|
| CN | 103365295 A | 10/2013 |
| EP | 1081972 B1 | 3/2001 |
| WO | 2011093681 A2 | 8/2011 |

OTHER PUBLICATIONS

Chizari et al., "Delaunay Triangulation as a New Coverage Measurement Method in Wireless Sensor Network", Sensors, 2011, vol. 11, 14 pages.

Robinson et al., "Assessment of urban-scale wireless networks with a small number of measurements", MobiCom '08, Sep. 14-19, 2008, San Francisco, USA, 12 pages.

Lucchi et al. "On Using a UAV to Collect Data From Low-Power Wireless Sensors" XIX Congresso Nazionale AIDAA, Sep. 17-21, 2007, 10 pages.

Romeu, et al. "Small UAV radiocommunication channel characterization" Proceedings of the Fourth European Conference on Antennas and Propagation (EuCAP), 2010, 5 pages.

Grzonka, et al. "A Fully Autonomous Indoor Quadrotor" IEEE Transactions on Robotics, 2011, vol. 28, Issue1, 11 pages.

Agilent Technologies. "Agilent E6474A Indoor Wireless Measurement System" published online at [http://literature.cdn.keysight.com/litweb/pdf/5968-8691E.pdf], Dec. 15, 2003, retrieved on Sep. 22, 2015, 8 pages.

Ascom. "Test & Measurement" published online at [http://www.ascom.com/en/index/our-solutions/solution/ant-test-and-measurement/solutionloader.htm], retrieved on Sep. 22, 2015, 1 page.

Tektronix. "Power Measurement of WLAN using DPX—Real Time Signal Analysis" video published online at [http://www.tek.com/webinar/power-measurement-wlan-using-dpx-real-time-signal-analysis], Mar. 23, 2011, retrieved on Sep. 22, 2015, 1 page.

Ekahau. "HeatMapper" published online at [http://www.ekahau.com/wifidesign/ekahau-heatmapper] retrieved on Sep. 22, 2015, 5 pages.

Fluke Networks. "AirCheck™ Wi-Fi Tester" published online at [http://www.flukenetworks.com/enterprise-network/network-testing/AirCheck-Wi-Fi-Tester] retrieved on Sep. 22, 2015, 13 pages.

Horner, Douglas. "A data-driven framework for rapid modeling of wireless communication channels" Naval Postgraduate School Dissertation, Monterey, California. Dec. 2013, 208 pages.

* cited by examiner

AUTONOMOUS ROBOT-ASSISTED INDOOR WIRELESS COVERAGE CHARACTERIZATION PLATFORM

CROSS-REFERENCE TO RELATED APPLICATIONS

This application is a continuation of, and claims priority to, U.S. Provisional Patent Application No. 61/995,942, filed on Apr. 25, 2014, and entitled "AUTONOMOUS UAV-ASSISTED INDOOR WIRELESS COVERAGE CHARACTERIZATION PLATFORM," the entirety of which is incorporated herein by reference.

TECHNICAL FIELD

The subject matter disclosed herein relates generally to wireless communication and, for example, to a wireless coverage characterization platform that uses unmanned aerial vehicles to autonomously collect wireless coverage parameters for an indoor environment.

BACKGROUND

To ensure robust and reliable wireless communication at all locations within a given service area or indoor environment (e.g., an office building, a campus area, a shopping mall, a school, etc.), it is important for network designers or communication service vendors to determine the wireless coverage quality throughout the area. For an area with an existing wireless network, various techniques can be used to characterize the wireless coverage in the area and identify points of weak wireless coverage, providing guidance as to where wireless access points or signal repeaters should be installed. For an area in which a new wireless network is to be established, wireless coverage characterization and planning can help network designers to determine how many wireless access points should be installed, where the access points should be installed, and how much power should be used to transmit the wireless channel signals in order to ensure that wireless access is reliable at all locations within the area.

Wireless coverage planning and characterization can be tedious and labor intensive tasks, often requiring a technician or engineer to collect manual channel measurements throughout the area, and also requiring prior knowledge of the building specifications (e.g., floor plans, wall locations, building materials, furniture layouts, etc.). Moreover, since some wireless coverage characterization techniques require extensive manual data entry, the integrity of the wireless network could be compromised as a result of inaccurate entry of data.

The above-described deficiencies of current wireless coverage characterization and planning techniques are merely intended to provide an overview of some of the problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Various embodiments described herein relate to an integrated unmanned vehicle-assisted wireless coverage characterization platform. In one or more embodiments, the platform consists of one or more small unmanned vehicles or robots, including but not limited to unmanned aerial vehicles (UAVs) such as quad-rotor helicopters, land robots, or other types of vehicles. Each vehicle is equipped with integrated wireless channel measurement and characterization processing units. Integrated simultaneous localization and mapping (SLAM) sensors and processing components can simultaneously map the area being surveyed and determine the vehicle's location within the area. The wireless channel measurement and characterization processing units can work in conjunction with the vehicle's navigation controls to direct the vehicle to locate and record locations of weak wireless coverage incrementally within the area being characterized with a minimum number of measurements and time. By autonomously or semi-autonomously traversing the wireless coverage area and characterizing the wireless signal strength and interference levels at locations throughout the area, the wireless coverage characterization platform can obtain accurate coverage results without the need to perform manual wireless channel measurements or data entry. Moreover, since the vehicle-assisted platform autonomously and incrementally maps the coverage area as it traverses the area, a priori knowledge of the indoor map or building floor plan is not required. Furthermore, the platform can dynamically direct the vehicle where to move and how many new radio frequency (RF) measurements to make based on the collected RF measurements and the incrementally constructed coverage map. Control algorithms executed by the platform direct the vehicle and select RF measurement points with the goal of reducing or minimizing the amount of measurements and time needed to construct the overall coverage map of the target area.

In some embodiments, a team of two or more autonomous vehicles (e.g., aerial or land-traversing vehicles or robots) can collaboratively characterize an area's wireless coverage and determine where to install the access points or base stations within the target coverage area. In such embodiments, at least one vehicle can transmit test signals from a selected location within the indoor environment, emulating an access point device. The test signals are received and measured by another vehicle at another location within the coverage area. Based on the relative locations of the vehicles and the strength of the received signal, the collaborative wireless coverage platform can assist in identifying suitable locations and power levels for wireless access point devices that will provide robust wireless access at all locations throughout the service area.

In one or more other embodiments, a team of two or more autonomous vehicles can perform collaborative signal measurements of a target indoor environment and identify sources and/or locations of interferences within the target environment.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
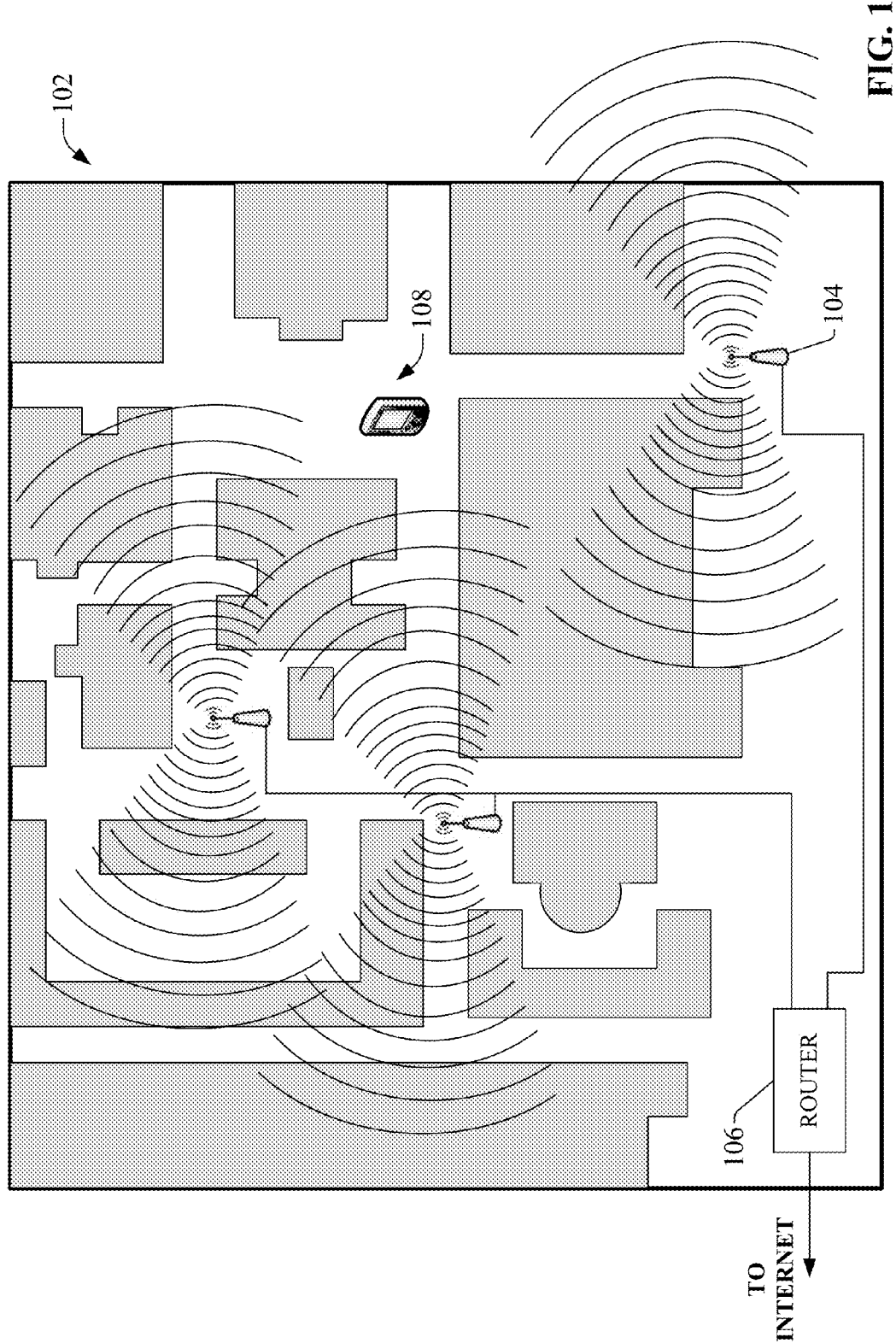
FIG. 1 is an example floor plan of an indoor environment in which an example wireless network is deployed.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is an example floor plan 102 of an indoor environment in which an example wireless network is deployed. In this example, non-limiting network, a number of wireless access point devices 104 are distributed across the indoor environment. These access point devices are communicatively connected to a network infrastructure device 106 (e.g., a router, modem, or other infrastructure device) that connects to an external network such as the Internet. The access point devices 104 wirelessly interface with mobile wireless devices 108 within the indoor environment (e.g., mobile phones, laptop computers, tablet computers, etc.) and act as bridges between the wireless devices and the external network (e.g., the Internet), allowing the wireless devices to wirelessly access the external network from within the indoor environment.

When designing a wireless network (e.g., a WiFi network, a long-term evolution (LTE) network, etc.) for an indoor environment such as an office building, shopping mall, residential area, campus hall, or other such area, designers must identify suitable locations and configuration settings for the wireless access point devices through which wireless devices will access an external network. The locations and settings (e.g., transmission power settings) for the access point devices should be selected to ensure that a strong wireless signal reaches all locations within the indoor environment. If the access point device signals are weak in some areas (sometimes referred to as "blind spots"), wireless access to the external network may not be reliable for mobile devices in those areas.

The strength of a wireless signal at a given location within a building is partly a function of the building's infrastructure. For example, walls and furniture within the building can block, attenuate, absorb, or reflect wireless channel signals broadcast by the access point devices. Moreover, the effect on a wireless signal as the signal passes through a wall or object depends on the material with which the wall or object is constructed.

To account for these many factors and to determine suitable locations for the wireless access point devices, wireless network designers or service providers must often perform simulations or tests that characterize the wireless coverage within a given indoor environment. A number of methods are conventionally used to characterize wireless coverage. For example, some available indoor coverage planning tools simulate the wireless coverage within the target indoor environment based on information provided by the user. Such planning tools typically require the user to manually provide information about the indoor environment, including floor plan dimensions, parameters of construction materials that make up the walls or other structures, locations and dimensions of partitions, window locations, and information about any furniture located throughout the environment. Based on this data, the planning tools simulate the target wireless coverage using ray tracing models or other simulation methods. These tools require the user to collect a large amount of information about the indoor environment prior to executing the simulation, much of which may not be readily available to the user. These planning tools also require the user to manually enter this information into the tool, opening the possibility of data entry errors which can yield inaccurate results. Moreover, since these tools are based on open-loop simulations rather than actual wireless signal measurements, the results generated by these planning tools may not accurately characterize the actual wireless channels.

In another example technique, real-time channel measurements can be collected manually and used to empirically verify coverage or identify areas of weak coverage throughout the indoor environment. However, collecting such channel measurements can be a time-consuming and laborious process, and the collected measurement data must be processed offline. The man-hours required to collect and process this data can increase the cost of wireless coverage planning.

To address these and other issues, one or more embodiments of the present disclosure provide an integrated vehicle-assisted indoor wireless coverage characterization platform. The platform can consist of one or more autonomous vehicles or robots; e.g., UAVs such as quad-rotor helicopters or other such aerial vehicles; land-traversing robots such as small self-navigating wheeled robots; or other such small vehicles or robots. The vehicle includes integrated wireless channel measurement and characterization components that allow the vehicle to characterize wireless coverage as the vehicle traverses an indoor environment. The vehicle can also include simultaneous localization and mapping (SLAM) sensors and associated processing components that map the physical layout of the indoor environment as well as determine the vehicle's location within the environment.

Since the vehicle can build a map of the indoor environment during traversal through the indoor environment, the system can characterize wireless coverage for the environment incrementally without the need for a priori information about the environment's topology (e.g., floor plan, partitions, furniture, or other obstructions). The wireless channel measurement components and SLAM sensor components can drive the vehicle's navigation sub-system to facilitate discovery of wireless coverage blind spots or areas of poor wireless coverage. Thus, the vehicle-assisted wireless coverage characterization platform can autonomously and incrementally learn key wireless coverage parameters for an indoor environment based on real signal measurements, and verify that all areas of the indoor environment have reliable wireless coverage (e.g., confirm that there are no areas within the indoor environment for which signal strength is below a defined threshold). Furthermore, the system can also direct the vehicle where to move and how many new RF measurements to make on-the-fly as the vehicle traverses the target environment based on the RF measurements obtained and the incremental RF coverage map constructed. Unlike conventional indoor wireless coverage planning tools that characterize wireless coverage based on simulations, the vehicle-assisted system described herein can obtain actual measured coverage data without the need for human operators to collect such data manually, without prior knowledge of the topology of the indoor environment, and without the need for excessive manual data entry.

Figure 2:
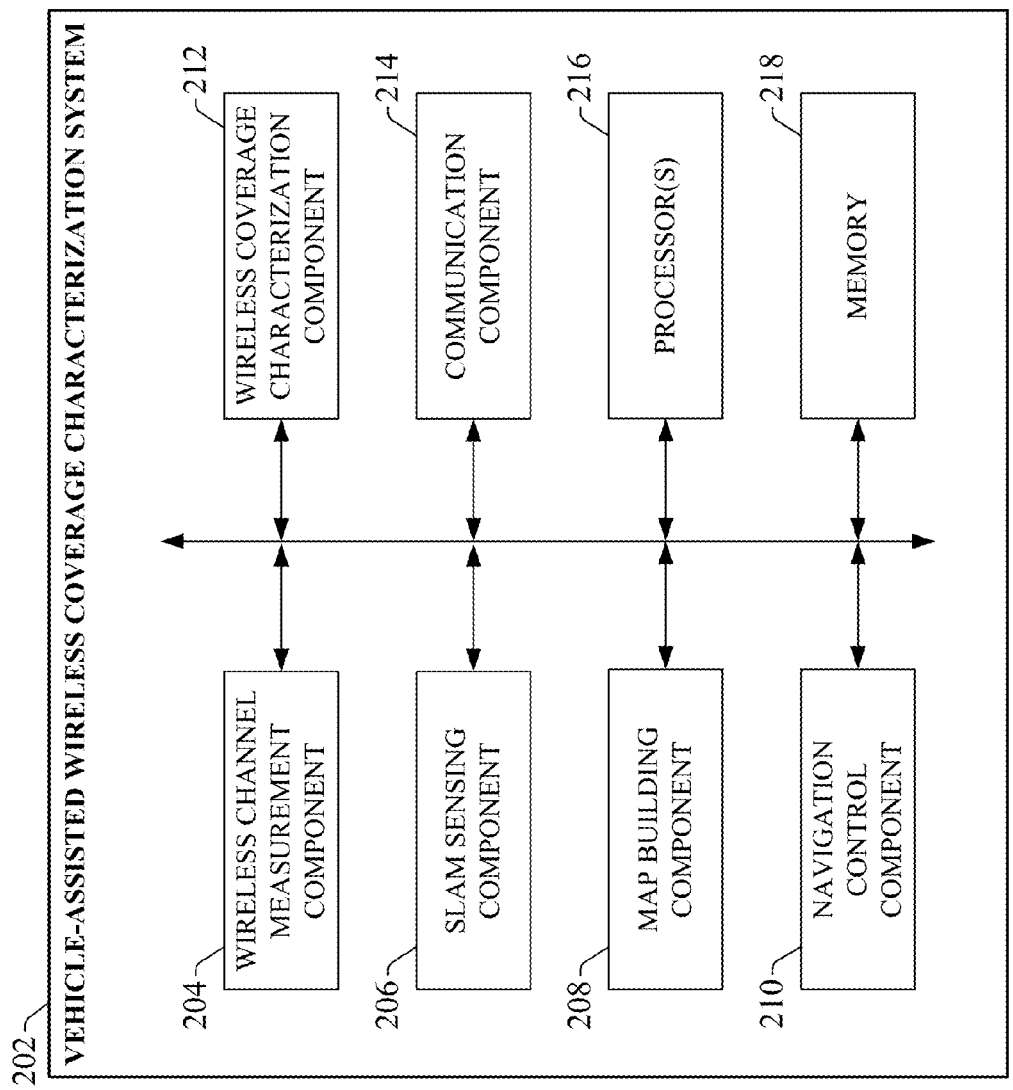
FIG. 2 is a block diagram of an example UAV-assisted wireless coverage characterization system.

FIG. 2 is a block diagram of an example vehicle-assisted wireless coverage characterization system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described. The components describe below can be implemented using hardware (e.g., integrated circuits such as field programmable gate arrays or other hardware), software, or a combination of hardware and software).

Although the wireless coverage characterization system 202 described herein can be integrated within any type of small autonomous or semi-autonomous vehicle or robot, features and examples of the wireless coverage characterization system will be described herein in connection with an unmanned aerial vehicle (UAV) such as a quad-rotor helicopter. However, it is to be appreciated that the systems and methods described herein can be implemented within any suitable type of small aerial or land vehicle or robot.

Wireless channel measurement component 204 can be configured to measure properties of wireless channel signals and to generate signal strength data based on the measurements. For example, the wireless channel measurement component can be configured to capture instantaneous channel fading information for a wireless signal, received signal strength indication (RSSI) information, or other such information. SLAM sensing component 206 can be configured to detect objects or surfaces within a sensing range of the UAV in which the system 202 is installed, and to determine distances between the UAV and points on the objects or surfaces in order to generate topological information of the UAV's immediate environment. The topological information can be used to build a layout of the indoor environment being measured. SLAM sensing component 206 can comprise, for example, one or more ultrasonic sensors, laser rangefinders, vision sensors, three-dimensional (3D) image sensors, or other such sensors capable of detecting objects and measuring point distance or point cloud information. Map building component 208 can be configured to generate map information for the indoor environment based on the measurement data generated by the SLAM sensing component 206. As the SLAM sensing component 206 collects more topology information for the indoor environment being measured, the map building component 208 will generate an increasingly comprehensive estimated floor plan for the indoor environment that can be used by the system to assist in characterizing the wireless coverage for the area and to determine suitable locations for access point devices. The map building component 208 can also be configured to track the UAV's location within the indoor environment within the context of the floor plan information.

The navigation control component 210 can be configured to guide the direction and speed of the UAV based on indoor map and location information generated by the map building component 208, as well as wireless measurement data generated by the wireless channel measurement component 204. For example, the navigation control component 210 can be configured to direct the UAV to locate areas of poor wireless coverage—or to otherwise characterize the wireless coverage—within the context of the estimated indoor area map, so that this information can be used to characterize the wireless coverage for the indoor environment. In some embodiments, the navigation control component 210 can also include global positioning system (GPS) capabilities that can operate in conjunction with other local sensors installed in the UAV to avoid obstacles during outdoor travel.

The wireless coverage characterization component 212 can be configured to generate coverage characterization information for the indoor environment based on the estimated indoor map generated by the map building component 208 and the wireless measurement data generated by the wireless channel measurement component 204. The characterization component can also generate the RF coverage and interference map incrementally with successively refined accuracy as more RF measurements are made when the vehicle traverses the indoor environment. The characterization information can comprise, for example, a wireless signal strength map for the indoor environment (e.g., a heat map depicting color-coded signal strength levels throughout the environment), identification of areas of weak wireless coverage within the indoor environment, instantaneous channel fading information, RSSI data, or other such information. In some embodiments, the wireless coverage characterization component 212 can also be configured to infer locations and power settings for access point devices that will provide comprehensive wireless coverage throughout the indoor environment, and to output these recommended locations and power settings for user consideration.

Communication component 214 can be configured to wirelessly communicate with one or more external devices in connection with characterizing the wireless coverage for the indoor area. For example, communication component 214 can be configured to provide a communication link between the UAV and another UAV to facilitate collaborative wireless coverage characterization of the indoor environment. The communication component 214 may also be configured to exchange data with an external processing device (e.g., a laptop, desktop, or tablet computer executing wireless coverage characterization software) in order to offload one or more processing functions to the external processing device.

The one or more processors 216 can perform one or more of the functions described herein with reference to the systems and/or methods disclosed. Memory 218 can be a computer-readable storage medium storing computer-executable instructions and/or information for performing the functions described herein with reference to the systems and/or methods disclosed.

Figure 3:
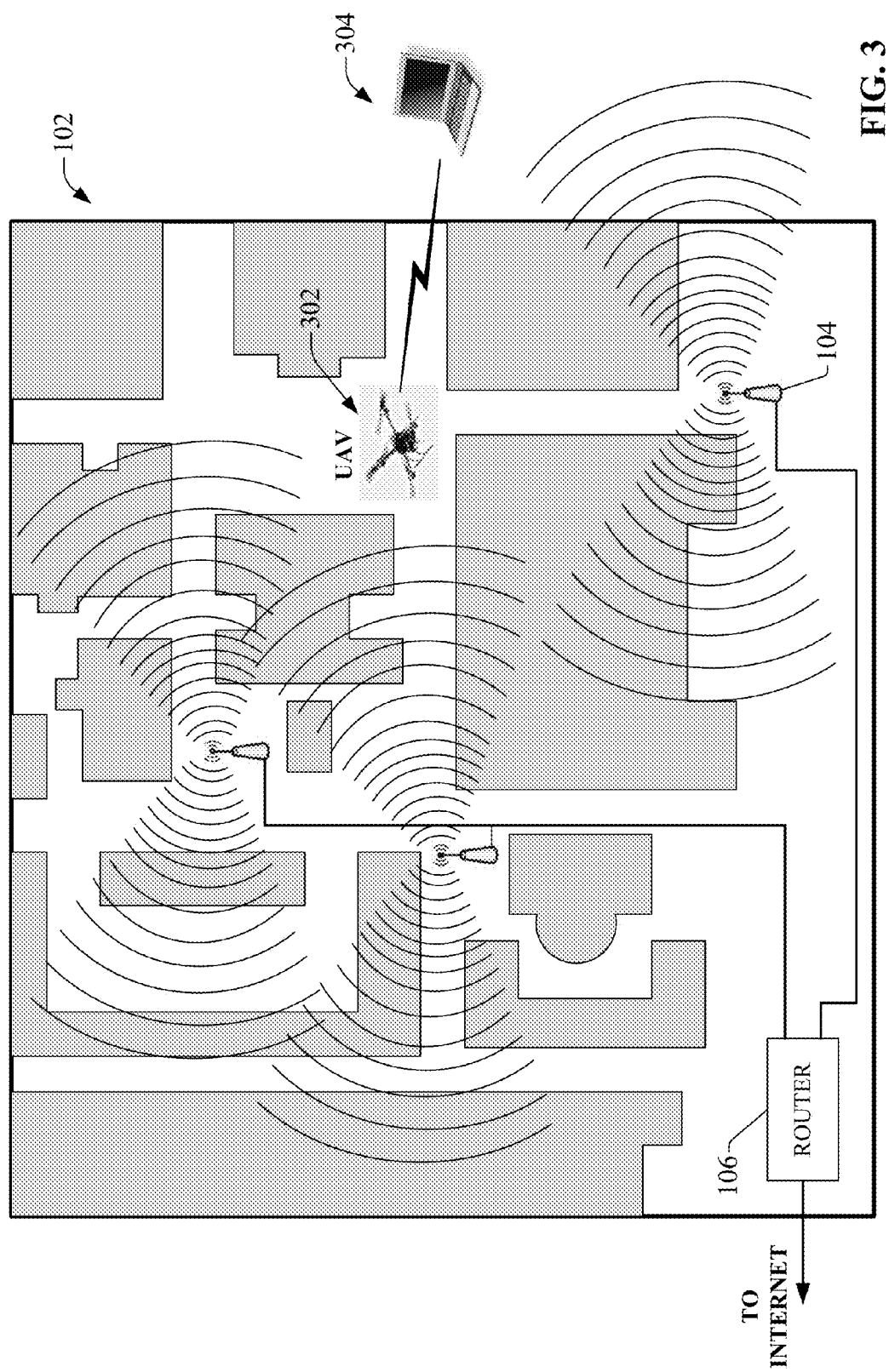
FIG. 3 is an example floor plan depicting a UAV traversing the indoor environment.

Although the wireless coverage characterization system is described herein as being implemented within a small quad-rotor helicopter, it is to be appreciated that the wireless coverage characterization techniques described herein are not limited to implementation in such vehicles, but rather can be an integrated system of substantially any type of UAV or other small autonomous mobile device capable of safely traversing an indoor environment FIG. 3 is the example floor plan 102 depicting UAV 302 traversing the indoor environment. The UAV 302 is equipped with wireless coverage characterization system 202, which causes the UAV to autonomously or semi-autonomously traverse the indoor environment. In an example scenario, a user can place the UAV 302 within the indoor environment (e.g., an office building, residential area, campus hall, school building, etc.) and initiate a data collection mode, either locally on the UAV 302 or remotely via an interface program executing on a remote computing device 304 (e.g., a laptop, desktop, or tablet computer, a mobile phone, etc.). In response, the UAV 302 will initiate its propulsion and navigation systems and begin traversing the indoor environment under the guidance of navigation control component 210, which executes a path determination algorithm that dynamically determines a navigation path for the UAV based on measurements taken by the SLAM sensing component 206 and wireless channel measurement component 204.

Initially, the UAV's integrated wireless coverage characterization system 202 has no information regarding the topology of the indoor environment (e.g., floor plan information, information regarding furniture or other obstructions located throughout the area, etc.) or the wireless coverage therein. The wireless coverage characterization system 202 will dynamically or incrementally build both map information (e.g., information regarding the floor plan of the indoor environment) and wireless coverage characterization data for the indoor environment as the UAV traverses the environment and collects both SLAM data and wireless channel measurement data. As more RF measurements are collected, the constructed RF coverage or interference map will have successively refined accuracy. Such incremental RF coverage and interference mapping features provide useful feedback to the vehicle regarding where it should move and how many new RF measurements it should collect incrementally so as to reduce or minimize the total number of RF measurements and time required to construct the overall RF coverage and interference map with required accuracy. When the wireless coverage characterization sequence is complete, the system will have generated both estimated indoor map information for the indoor environment as well as wireless coverage characterization information for the environment. As will be described in more detail below, the wireless channel measurement component 204, SLAM sensing component 206, map building component 208, and navigation control component 210 operate in conjunction to determine suitable navigation paths and measurement points for the UAV that allow the system to comprehensively characterize the wireless coverage within the indoor area.

Figure 4:
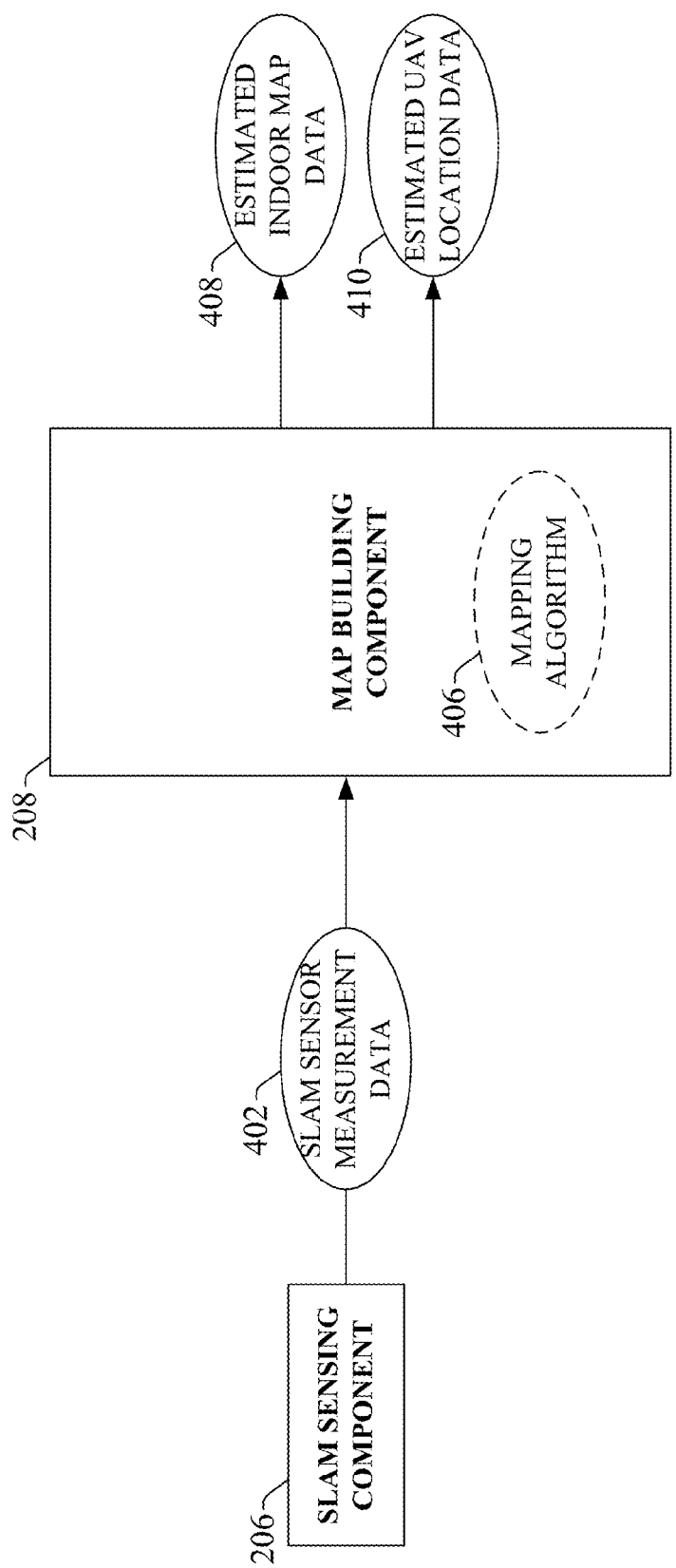
FIG. 4 is a diagram illustrating example inputs and outputs of a map building component.

FIG. 4 is a diagram illustrating example inputs and outputs of the map building component 208. As noted above SLAM sensing component 206 can measure the distances between the UAV and surfaces (or points on the surfaces) within a sensing range of the UAV using one or more distance or area sensors (e.g., ultrasonic sensors, laser rangefinders, vision sensors, 3D image sensors, or other such sensors). The resulting SLAM sensor measurement data 402 generated by the SLAM sensing component can comprise, for example, three-dimensional point cloud information representing a topology of the UAV's surroundings generated based on measured distances between the UAV and surface points near the UAV. The system 202 can collect this distance measurement data as the UAV traverses the indoor environment. These measurements can be taken either continuously, periodically, or in accordance with a SLAM sensing algorithm that initiates measurement in response to defined measurement trigger conditions. In general, the SLAM sensor measurement data 402 collected by the SLAM sensing component 206 informs the UAV-assisted system of the objects and surfaces (e.g., walls, floors, ceilings, furniture, obstructions, corners, etc.) within the UAV's immediate environment. The UAV's navigation system uses this information to prevent collisions and, together with data generated by the map building component 208, to guide the UAV to selected wireless channel measurement locations within the indoor environment.

The map building component 208 processes the SLAM sensor measurement data 402 generated by the SLAM sensing component 206 using a mapping algorithm 406 to generate estimated indoor map data 408 and estimated UAV location data 410. Estimated indoor map data 408 represents the indoor environment in terms of its floor plan and any other physical obstructions present within the environment, including but not limited to furniture, office equipment, or other such obstructions. The estimated indoor map data 408 records the relative locations of the walls and obstructions, including the distances therebetween. In some embodiments, the estimated indoor map data 408 can characterize the indoor environment three-dimensionally, such that the locations and contours of the ceiling and floors are also recorded in the estimated indoor map data 408.

When the UAV begins traversal of a previously unsurveyed indoor environment, the system has no knowledge of the environment. As the UAV traverses the environment and collects a growing amount of SLAM sensor measurement data 402, the system's knowledge of the indoor map gradually increases until enough information has been obtained to represent the environment to a degree sufficient to for wireless channel characterization and planning purposes. As will be described in more detail below, collection of SLAM sensor measurement data 402 and building of the estimated indoor map occurs concurrently with measurement and characterization of the wireless coverage in the indoor environment.

Estimated UAV location data 410 represents the UAV's location and orientation within the indoor environment. In particular, the estimated UAV location data 410 describes the UAV's location within the context of the estimated indoor map represented by the estimated indoor map data 408. This information is used by the system to prevent collisions, to maintain proper spatial orientation of the UAV, and to dynamically determine travel paths for the UAV as well as the number of new RF measurements to be made by the vehicle's wireless channel measurement sensors in connection with obtaining wireless channel measurements at selected locations within the indoor environment. The estimated indoor map data 408 and estimated UAV location data 410 is stored in memory 218.

Figure 5:
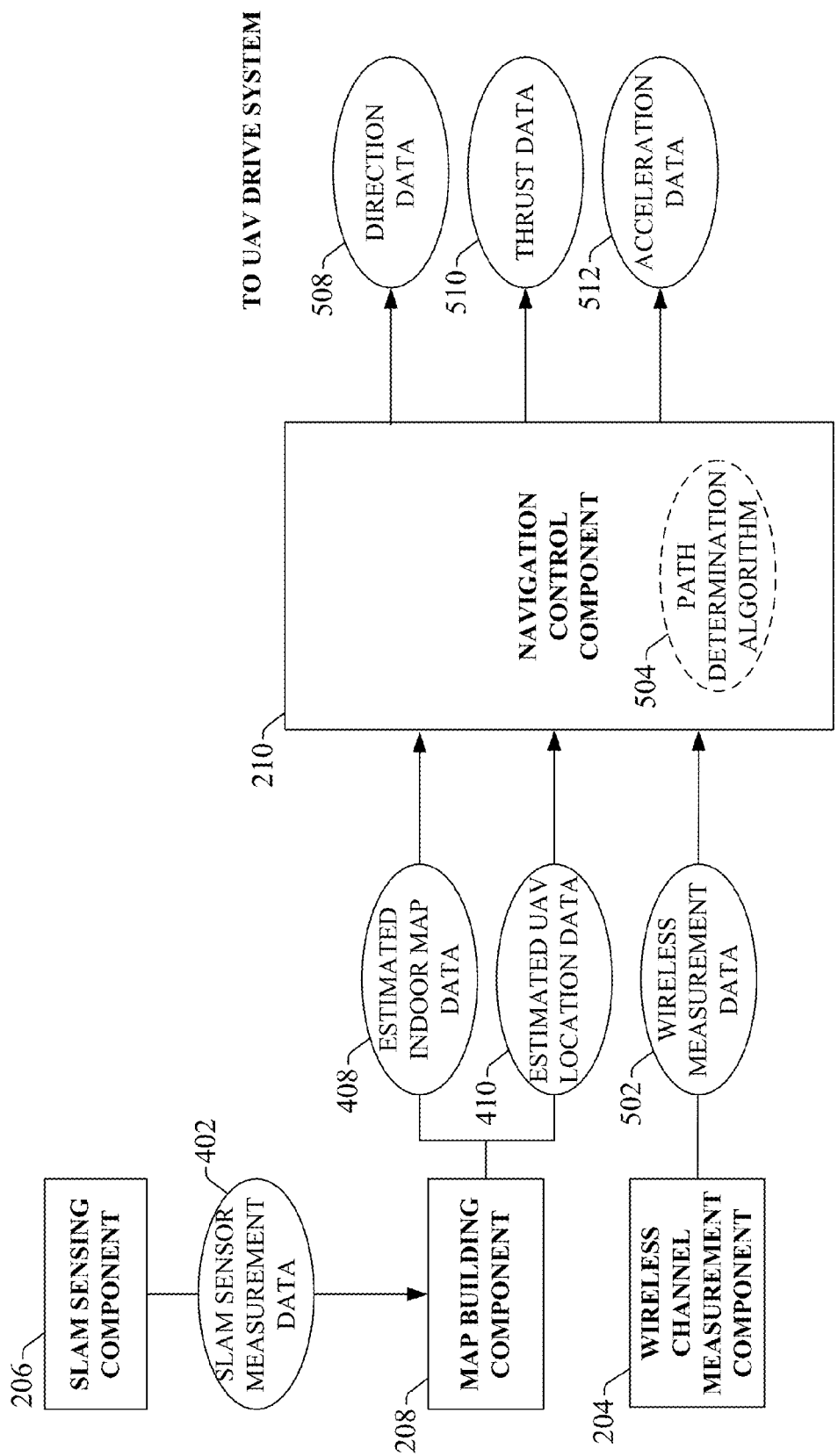
FIG. 5 is a diagram illustrating example inputs and outputs of a navigation control component, which controls a UAV's travel path through an indoor environment.

FIG. 5 is a diagram illustrating example inputs and outputs of the navigation control component 210, which controls the UAV's travel path through the indoor environment. As noted above, SLAM sensing component 206 provides SLAM sensor measurement data 402 to map building component 208, which generates estimated indoor map data 408 and estimated UAV location data 410 based on the SLAM measurements. As the map building component 208 is generating the indoor map and UAV location data, wireless channel measurement component 204 measures the strength of the wireless access point signal at the UAV's present location (that is, the wireless signal generated by the one or more access point devices 104, and generates wireless measurement data 502 based on the measurements. For example, in one or more embodiments, the wireless channel measurement component 204 can capture instantaneous channel fading information and/or RSSI information for the detected wireless signal from the access point devices at the UAV's current location. The system associates each wireless measurement result generated by the wireless channel measurement component 204 with the location within the estimated indoor map at which the measurement data was read so that a wireless coverage map can be generated for the indoor environment.

The navigation control component 210 processes the estimated indoor map data 408, the estimated UAV location data 410 and the wireless measurement data 502 in accordance with a path determination algorithm 504 to determine a travel path for the UAV and generate suitable UAV drive control signals to facilitate traversal over the determined path. To determine a suitable path, the navigation control component 210 can select a target destination for the UAV and dynamically calculate a path for traversing from the UAV's present location to the selected path based on the estimated indoor map information. For example, based on (1) the estimated current location of the UAV within the indoor map, (2) presumed missing portions of the indoor map (that is, areas of the indoor environment that have not yet been scanned by the SLAM sensing component 206), and (3) areas of the known indoor map for which wireless channel measurements have not yet been collected, the navigation control component 210 can select a new destination for the UAV at which SLAM and/or wireless signal measurements are to be obtained. The navigation control component 210 can then generate direction data 508, thrust data 510, acceleration data 512, or other navigation parameters for navigating the UAV to the new location. During traversal of the UAV to the target destination, the navigation control component 210 may dynamically alter the selected path based on new SLAM sensor information as necessary.

In general, the path determination algorithm 504 is designed to satisfy the dual goals of (1) discovering the complete floor plan for the indoor environment and (2) characterizing the wireless coverage provided by the access point devices at all locations within the discovered floor plan. The wireless coverage characterization system 202 collects both sets of measurements required for these dual goals—SLAM measurements and wireless channel measurements—as the UAV traverses the travel paths calculated by the navigation control component 210, allowing the estimated indoor map and the wireless coverage characterization results to be generated in parallel.

The path determination algorithm 504 implemented by the navigation control component 210 can also define additional criteria that must be satisfied in connection with selecting locations at which to take measurements and determining the travel path to those locations. For example, the path determination algorithm 504 may enforce a requirement that the SLAM and wireless sensor data required to complete construction of a wireless coverage characterization or interference map for the indoor environment should be collected with a minimal number of measurements. To this end, the path determination algorithm 504 can implement a closed-loop measurement routine that dynamically selects the next measurement location based on the updated aggregated estimated indoor map data and estimated UAV location data each time a wireless measurement is taken. For example, when the wireless channel measurement component 204 obtains a wireless signal measurement at the UAV's current location, the wireless coverage characterization component 212 updates the wireless coverage or interference map to include the new measurement data (as will be described in more detail below in connection with FIG. 6). The path determination algorithm 504 then analyzes the wireless coverage or interference map data collected thus far and determines how many additional measurements will be required to complete the wireless coverage or interference map, as well as the locations of these additional measurements, such that the determination of the number and locations of the additional measurements is subject to a requirement to minimize the total number of measurements (or the total amount of time) required to collect all the necessary measurement data. The algorithm then selects one of the determined measurement locations as the next target destination for the UAV, and the navigation control component 210 controls the navigation signals (e.g., direction data 508, thrust data 510, acceleration data 512, etc.) to direct the UAV to this selected target location.

The selection of the next target location from the determined remaining measurement locations may also be based on the requirement to minimize the time required to collect all the remaining measurements. For example, based on the UAV's current location within the indoor environment and the remaining measurement locations still to be taken, the path determination algorithm 504 can estimate relative times required to collect all the remaining measurements for each of a plurality of possible measurement collection paths, where each collection path represents a different order through which the UAV can traverse the remaining measurement locations. The path determination algorithm 504 can then determine which path (that is, which measurement collection order) will require the least amount of time to collect the remaining measurements, and select the first location measurement location in this selected path as the next target location for the UAV.

The system can dynamically modify the estimated number and locations of the remaining measurements and/or the selected order in which the measurements are to be taken as new wireless and/or SLAM sensor measurement data is collected, or the number of new RF measurements to collect at each location. Such information can be determined "on-the-fly" based on the RF measurements collected so far and/or the incremental RF coverage map constructed. For example, after the UAV arrives at the next selected measurement location and collects the wireless measurement at that location, the wireless coverage or interference map will be updated, and the path determination algorithm 504 can reassess the number and locations of the remaining measurements necessary to complete the wireless coverage characterization based on the updated coverage information. In this way, the UAV-assisted wireless coverage characterization platform serves as a closed-loop measurement system that dynamically optimizes or substantially optimizes the time required to accurately characterize the wireless coverage in the target environment.

Figure 6:
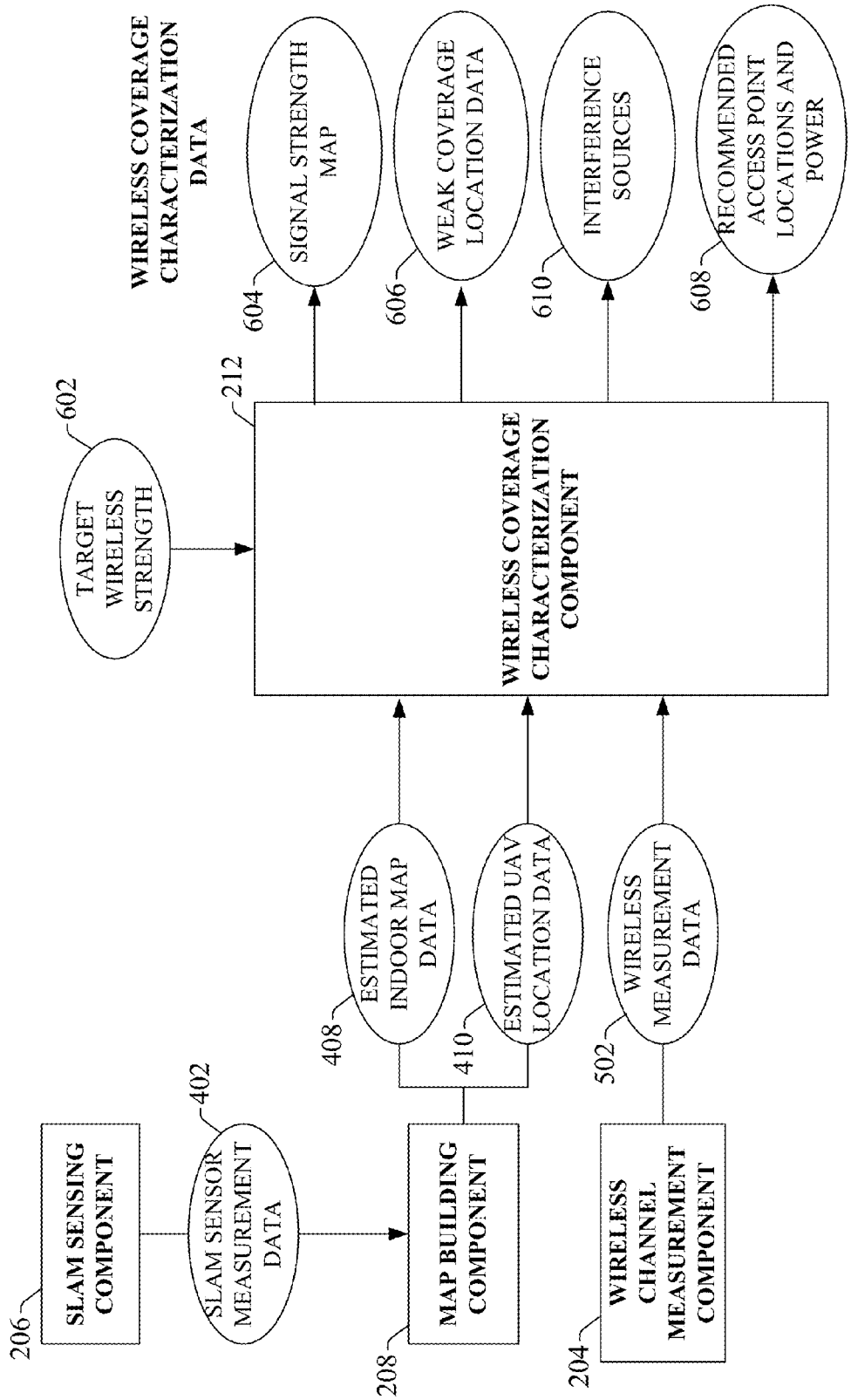
FIG. 6 is a diagram illustrating example inputs and outputs of a wireless coverage characterization component, which generates a wireless coverage map for an indoor environment based on estimate indoor map and wireless measurement data.

FIG. 6 is a diagram illustrating example inputs and outputs of the wireless coverage characterization component 212, which generates a wireless coverage map for the indoor environment based on the estimate indoor map and the collected wireless measurement data. As described above, the map building component 208 generates estimated indoor map data 408 and estimated UAV location data based on the SLAM sensor measurement data 402, while wireless channel measurement component 204 generates wireless measurement data 502 indicative of the wireless access point signal strength at the UAV's location within the indoor environment. In addition to being used to control the navigation path of the UAV, this data is also processed by the wireless coverage characterization component 212 to generate information that characterizes the wireless coverage across the indoor environment.

In one or more embodiments, the wireless coverage characterization component 212 can generate a signal strength map 604 based on the collected wireless measurements, the estimated indoor map, and the estimated UAV location information. For example, as the estimated indoor map is being built, the wireless coverage characterization component 212 can associate a newly received wireless signal strength measurement with a location on the indoor map corresponding to the current UAV location (the location at which the measurement was taken). As the UAV traverses the indoor environment under the guidance of navigation control component 210, the map building component 208 will continue updating the estimated indoor map (based on the SLAM sensor measurement data 402) as the wireless coverage characterization component 212 continues mapping new wireless signal strength measurements to locations on the estimated indoor map. In this way, the UAV-assisted system dynamically constructs a map (e.g., a floor plan) of the indoor environment as well as a map of the measured wireless signal strengths at locations throughout the mapped environment.

In another example, the wireless coverage characterization component 212 can generate weak coverage location data 606 identifying areas of weak wireless coverage within the indoor environment. As with the signal strength map 604, the wireless coverage characterization component 212 can map the weak coverage locations to the estimated indoor map based on the UAV location at the time the weak coverage areas were detected. In some embodiments, the wireless coverage characterization component 212 can identify the areas of weak coverage by comparing the measured wireless signal strength at a given location with a defined target signal strength 602, which may be specified by a user via a suitable interface application. Areas having a measured signal strength below the target wireless signal strength are flagged as weak coverage locations.

In one or more embodiments, the wireless coverage characterization component 212 can be configured to identify and locate sources of wireless interference that may be negatively affecting the signal strength, data throughput, and/or reliability of the wireless channel within the indoor environment. Such sources of wireless interference can include, for example, wireless devices or equipment (e.g., cordless phones, near-field devices, wireless audio speakers, wireless game controllers, etc.), certain electrical devices that emit radio frequencies that interfere with the wireless coverage (e.g., monitors, fluorescent lights, microwave ovens), or other such interference sources. In such embodiments, the wireless coverage characterization component 212 can detect or infer one or more locations of wireless interference within the indoor environment.

When the UAV's survey of the indoor environment is complete, the system 202 can make the signal strength map 604, the weak coverage location data 606, and/or the locations of the interference sources 610 available for viewing. For example, a separate interface application executing on an external computing device (e.g., a desktop, laptop, or tablet computer) can communicatively connect to the wireless coverage characterization system 202 via the communication component 214, either wirelessly or over a wired network connection (e.g., Ethernet, universal serial bus, etc.) and retrieve the estimated indoor map and wireless characterization data collected by the system and stored in memory 218. The interface application can then render the collected data in a suitable visualization format for viewing by the user. In an example, non-limiting presentation format, the interface application can display the wireless coverage information as a heat map overlaid on the indoor map estimated by the map building component 208, such that different heat map colors represent different wireless signal levels throughout the indoor environment. This format can convey the relative levels of signal strength at all locations throughout the indoor environment. In another example presentation format, interface application can display the estimated indoor map and graphically indicate the discovered areas of weak wireless coverage and/or the locations of the wireless interference sources. It is to be appreciated that the system is not limited to these interface formats, and that any suitable display format for conveying the wireless characterization results is within the scope of one or more embodiments of this disclosure.

In some embodiments, the wireless coverage characterization component 212 can also be configured to infer—based on the signal strength map 604, the weak coverage location data 606, and/or the detected interference sources 610—new locations and/or power level settings for access point devices that will result in reliable wireless coverage at all locations within the indoor environment, or otherwise minimize the areas of poor wireless coverage. The system can then identify these recommended access point locations and power levels 608 to the user via the interface application; e.g., by graphically indicating the proposed locations of the access point devices on the estimated indoor map. In an example scenario, based on an analysis of the signal strength map, the wireless coverage characterization component 212 may determine that moving an existing wireless access point device from its present location to a new location will eliminate a weak coverage area discovered by the system as a result of the UAV's survey of the indoor environment. Accordingly, the system can generate and display instructions for relocating the access point device to its recommended new location. In some embodiments, the wireless coverage characterization component 212 can determine the suitable new location for the access point device based by performing a simulation of various test access point locations. Such simulations can use the estimated indoor map and actual signal strength information collected by the system as inputs to a simulation model, which simulates wireless signal coverage results for various alternative access point locations. Based on results of these simulations, the wireless coverage characterization component 212 can identify one or more suitable alternative access point device locations that have a likelihood of eliminating or reducing the areas of weak signal coverage.

In another example, the wireless coverage characterization component 212 may recommend installing a new wireless access point device, or increasing the power level on an existing wireless access point device, in order to eliminate a discovered area of weak coverage. As in the previous example, the wireless coverage characterization component 212 can generate these recommendations based on simulations performed on the collected indoor map and signal strength data.

In another example operating mode, multiple UAVs can be deployed within the indoor environment in order to build the indoor map and characterize the wireless coverage more quickly and efficiently. In this collaborative mode of operation, rather than or in addition to generating the indoor map and wireless characterization data locally, the communication component 214 of each UAV's wireless characterization system can wirelessly transmit its estimated indoor map data 408, estimated UAV location data 410, and wireless measurement data 502 to a remote wireless coverage characterization application, such as an application executing on computing device 304. The application executing on computing device 304 can then aggregate the data received from the multiple UAVs and generate a composite estimated indoor map and wireless coverage map; e.g. using versions of the map building and wireless coverage characterization components running on the computing device 304 as part of the application. By using multiple UAVs in this fashion, the indoor map and wireless coverage characterization information (including identification of weak wireless coverage areas and/or interference sources) can be generated more quickly.

In a variation of this collaborative operating mode, the communication between the UAVs and the computing device 304 can be bi-directional, allowing the wireless coverage communication application executing on the computing device 304 to perform supervisory navigation control of the UAVs based on the aggregate indoor map and wireless coverage characterization information maintained on the computing device 304. Since the centralized wireless coverage communication application will possess a more complete estimation of the estimated indoor map and the wireless coverage for the indoor environment than any of the individual UAVs providing the measurement data, the application can make a determination as to where further SLAM and wireless channel measurements should be taken in order to complete the wireless coverage characterization for the environment, select which UAVs are in the best locations to take the respective measurements, and send instructions over a wireless channel to the respective UAVs to navigate to the determined measurement locations and collect the required measurement data.

In yet another variation of this collaborative operating mode, rather than sending the SLAM and wireless coverage measurements to a supervisory application running on a separate computing device 304, the team of UAVs may include a designated master UAV to which all other UAVs in the team report their collected SLAM and wireless channel measurements. The master UAV can include the processing components necessary to aggregate the distributed measurement data and generate the composite indoor map and wireless coverage estimations, essentially performing the same function as the wireless coverage application described above. In some embodiments of this configuration, the master UAV can also send supervisory navigation instructions to the other UAVs of the team based on determinations of where subsequent SLAM and wireless measurements should be taken in order to complete the indoor map and wireless coverage characterization, as well as which UAVs are in the best position to collect those measurements.

Figure 7:
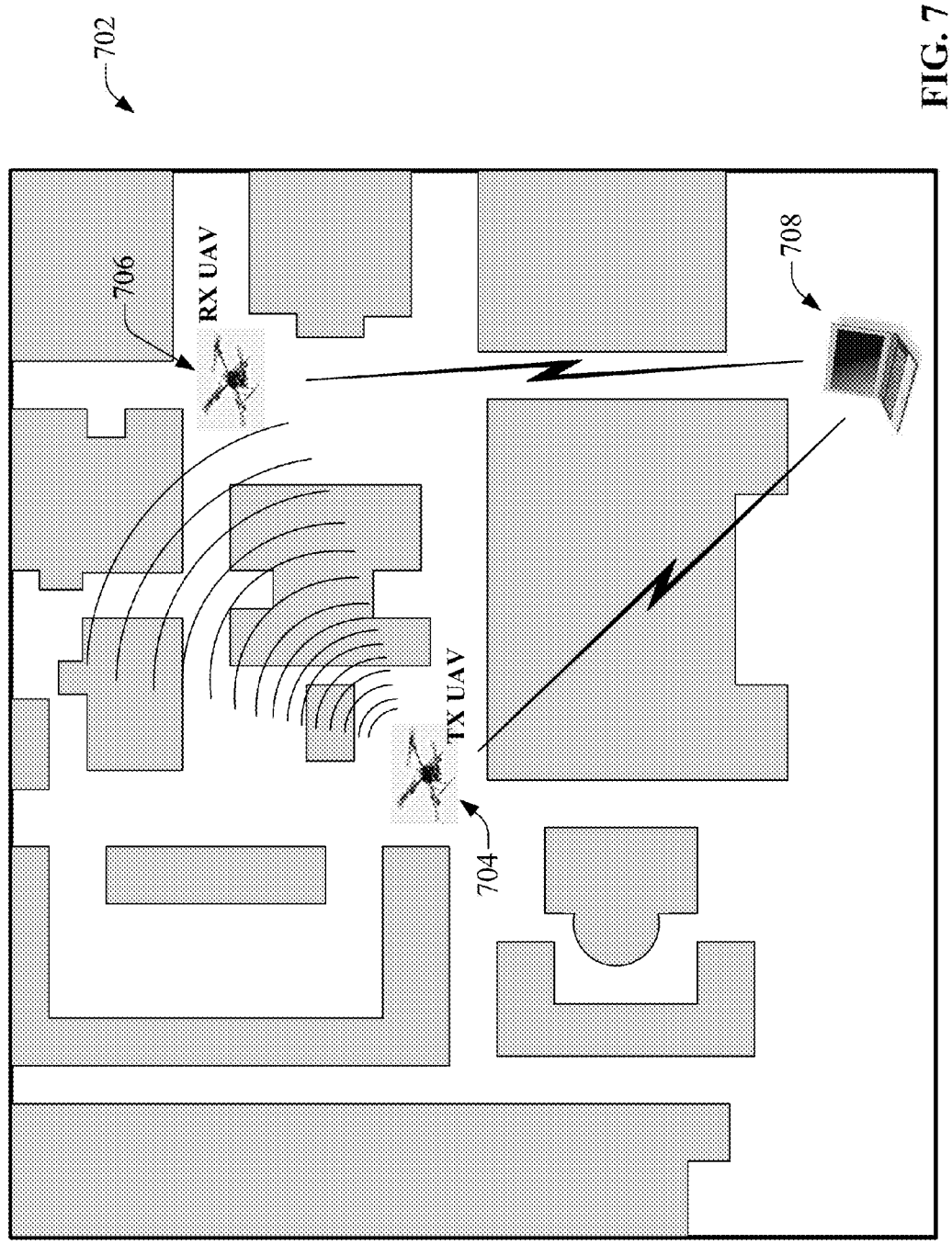
FIG. 7 is an example floor plan depicting a pair of UAVs traversing an indoor environment in order to infer suitable access point device locations and configuration settings.

In another example collaborative operation scenario, a team of UAVs can be deployed in an indoor environment in which a new wireless network is to be installed, and can collaboratively determine optimal access point device locations that will ensure reliable wireless coverage at all areas of an indoor environment. FIG. 7 is an example floor plan 702 depicting a pair of UAVs traversing an indoor environment in order to infer suitable access point device locations and configuration settings (e.g., power settings). In this example operating scenario, UAVs 704 and 706 both include an integrated wireless coverage characterization system 202. UAV 704 is equipped with a radio frequency (RF) transmitter and acts as a transmitting UAV. UAV 706 is equipped with an RF receiver and acts as a receiving UAV. As the UAVs 704 and 706 traverse the indoor environment, the transmitting UAV 704 transmits an RF signal at selected times, simulating the transmission of a wireless communication channel by an access point device. The receiving UAV 704 receives and measures the signal transmitted by the transmitting UAV 706. The UAVs 704 and 706 will traverse the indoor environment according to a decentralized algorithm executing locally on each UAV, simultaneously collecting SLAM measurements for generation of the estimated indoor map (used by the map building and navigation control components 210 of the respective UAVs to characterize the topology of the indoor environment and to guide navigation of the UAVs) and executing collaborative wireless measurements at locations selected by the decentralized algorithm.

To more quickly build the estimated indoor map and facilitate autonomous navigation of the UAVs through the indoor environment, as the UAVs 704 and 706 generate indoor map estimations based on their respective local SLAM measurements, the UAVs can share their indoor map estimation data with one another over a wireless channel so that each UAV can more quickly build the complete indoor map, allowing the navigation control and wireless coverage characterization components to more efficiently determine where the UAVs should be positioned for respective collaborative wireless measurements. The UAVs can also share their current locations with each other over the wireless channel.

In an example configuration, one of the UAVs 704 or 706 can serve as a master UAV that executes a supervisory control algorithm. The supervisory algorithm determines—based on the aggregate indoor map estimation, the current locations of the respective UAVs, and the wireless coverage data already collected—where the respective UAVs should be positioned in order to obtain the next wireless measurement (that is, where the transmitting and receiving UAVs should be located when the next wireless signal strength measurement is taken). The communication component 214 of the master UAV can then issue navigation instructions to the other UAV(s) indicating a new target location for the UAV(s) for collection of the next wireless measurement.

For example, the wireless coverage characterization component 212 of the master UAV may be in the process of characterizing the wireless coverage that would be detected within the indoor environment if an access point device were positioned at a hypothetical Location A within the indoor environment. To characterize this coverage, the wireless coverage characterization component 212 determines that the signal strength afforded by such an access point device should be measured at a Location B. Accordingly, the communication component 214 of the master UAV (the transmitting UAV 704 in this example scenario) sends an instruction to the communication component 214 of the receiving UAV 706 to move to location B. Once the receiving UAV 706 has moved to the indicated location (as determined by measurements taken by the SLAM sensing component of the receiving UAV 706), the receiving UAV 706 sends a confirmation message to the transmitting (master) UAV 704. The transmitting UAV 704 then broadcasts the test signal (at a test power level), which is measured by the wireless channel measurement component 204 of the receiving UAV 706. This measurement result, as well as other similar measurements, are used by the wireless coverage characterization component 212 of the master UAV to ascertain suitable locations and power levels of access point devices that will ensure reliable wireless signal coverage at all areas of the indoor environment. By basing the access point locations on real wireless measurements obtained collaboratively by the UAVs, the system automatically takes the indoor topology (e.g., walls, furnishings, etc.) and sources of wireless interference into consideration when selecting suitable access point locations.

In one or more embodiments, the system can allow the user to enter one or more design parameters that will act as constraints on the UAVs' operation and test results. For example, the system may allow the user to enter a maximum number of access point devices that are to be installed within the indoor environment. The system may also allow the user to enter a maximum transmission power that is to be set for any access point devices installed within the indoor environment (this may be a design consideration intended to reduce the possibility of interference with neighboring wireless systems, or to limit the coverage area created by the access point devices to areas within the indoor environment). Accordingly, the wireless coverage characterization component 212 can coordinate with the navigation control component 210 in the respective UAVs to select suitable test locations for transmission and measurement of the test signals by the transmitting and receiving UAVs, with the goal of identifying locations for access point devices that will provide reliable coverage throughout the indoor environment while satisfying the design parameters entered by the user.

In a variation of this collaborative operating mode, rather than configuring one of the UAVs to serve as a master UAV that guides the navigation of the other UAVs (as well as its own navigation), the team of UAVs may operate under the guidance of a centralized supervisory application running on a separate computing device 708 (e.g., a desktop, laptop, or tablet computer). In this example scenario, the UAVs send their respective estimated indoor map data and wireless measurement to the supervisory application over a dedicated wireless channel. Based on the aggregate indoor map estimation, the wireless measurements already collected, and the current locations of the respective UAVs, the supervisory application will determine where the next transmission and reception positions should be in order to obtain the next wireless measurement and a power level at which the test signal should be transmitted by the transmitting UAV 704. The computing device 708 can then issue the position instructions to the respective UAVs 704 and 706, and instruct the UAVs to perform the next measurement when the UAVs have sent confirmations that they are in the indicated positions.

Although only two UAVs are depicted in FIG. 7, larger teams of UAVs can also be deployed within the indoor environment in order to characterize the signal propagation characteristics of the indoor environment and generate access point recommendations more quickly. In an example scenario, one UAV can be configured as a transmitting UAV, while multiple other UAVs can be configured as receiving UAVs. This allows a test signal generated by the transmitting UAV at a given test location to be measured at multiple locations simultaneously by the receiving UAVs, thereby collecting larger sets of wireless signal measurements for each test signal broadcast. In such a configuration, the supervisory application executing on the master UAV or the computing device 708 determines where each receiving UAV should be located for a given test broadcast based on the estimated indoor map (constructed based on SLAM measurements from all UAVs) and the wireless signal measurements already collected. For example, the supervisory application may identify areas of the estimated indoor map for which signals have not yet been measured, and instruct selected receiving UAVs to navigate to those locations for the next test measurement. In another collaborative scenario, multiple transmitting UAVs can be deployed together with multiple receiving UAVs, allowing the collaborative system to test a multiple access point device scenario more accurately.

In one or more embodiments, the collaborative UAV operating scenario can also be used to identify and locate sources of wireless interference that may potentially attenuate the signal strength, data throughput, and/or reliability of a wireless channel to be installed within the wireless environment. For example, based on the measurements taken by the receiving UAV(s) at various locations relative to locations of the transmitting UAV(s), the system can detect or infer sources of wireless channel interference within the indoor environment and generate report data identifying these interference sources.

By implementing a closed-loop learning method that uses real wireless measurements, the UAV-assisted system described herein can yield more accurate wireless characterization data relative to simulation-based planning tools. At the same time, by collecting these wireless measurements and learning key wireless coverage parameters autonomously, the UAV-assisted system can significantly reduce time, man-power, and costs associated with verifying new wireless network deployments or evaluating new wireless technologies.

Figure 8:
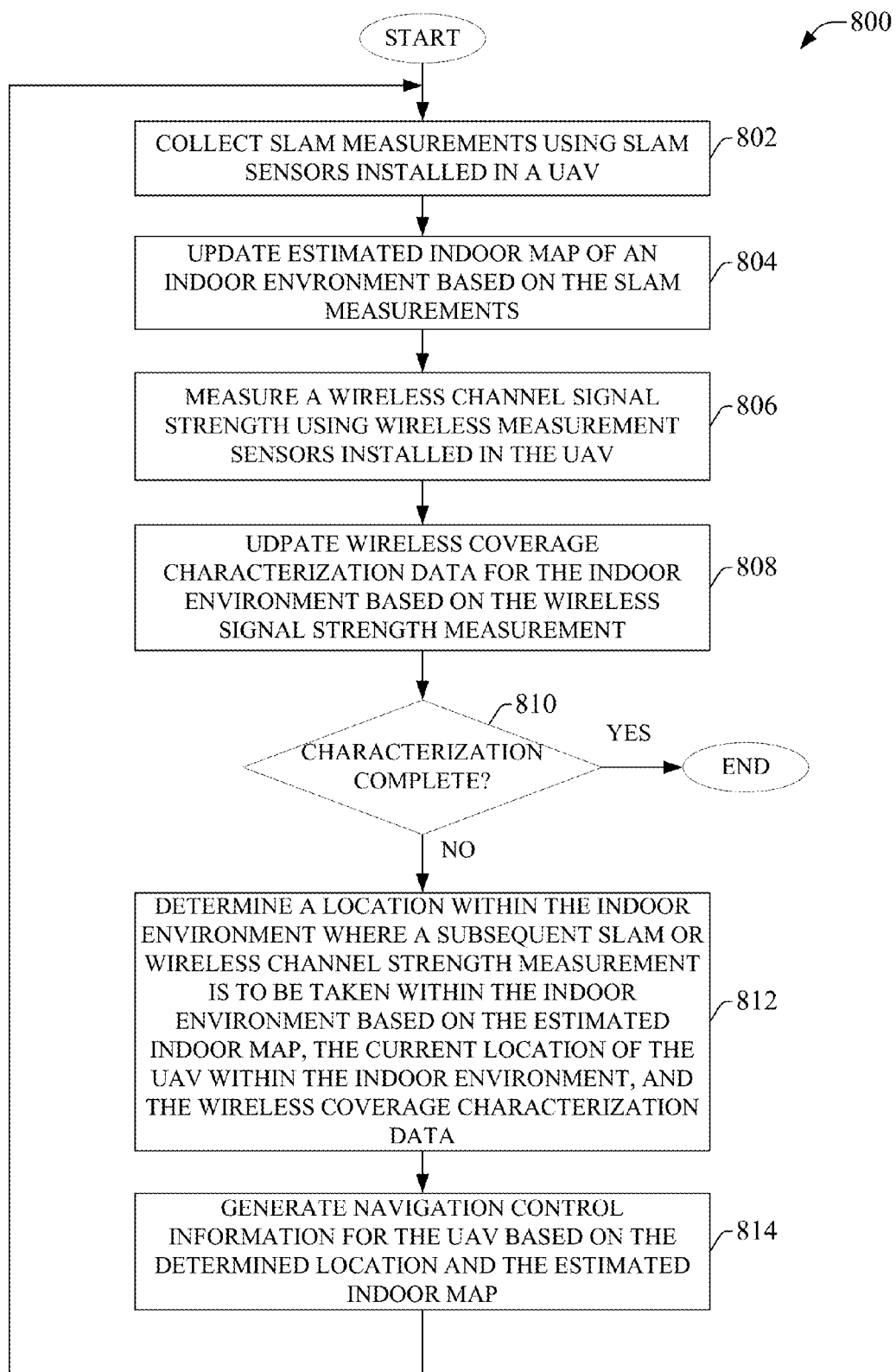
FIG. 8 is a flowchart of an example methodology for performing wireless channel measurements and coverage characterization for an indoor environment using one or more UAVs.
Figure 9A:
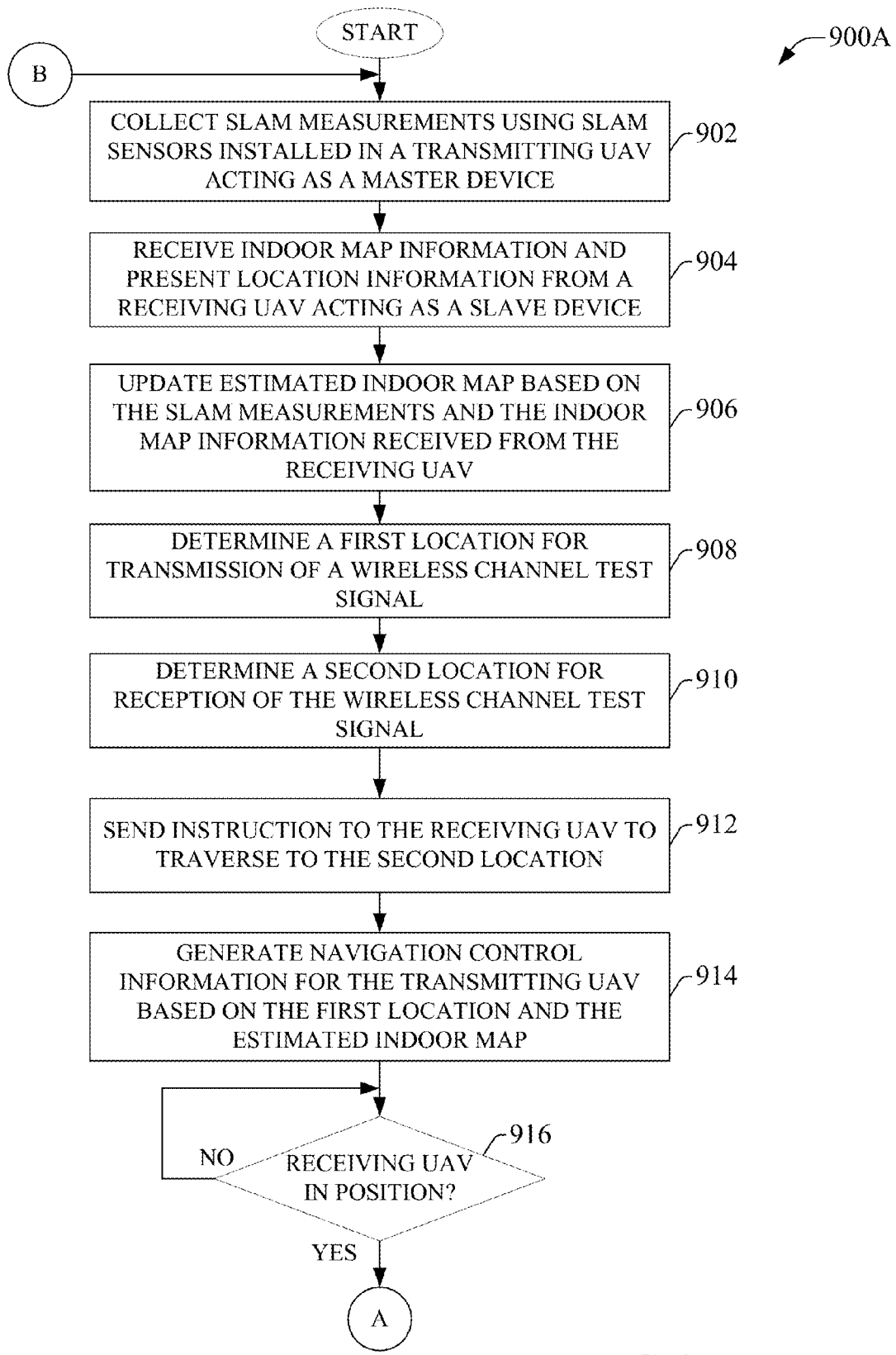
FIG. 9A is a first part of a flowchart of an example methodology for autonomously or semi-autonomously surveying an indoor environment using collaborative UAVs in order to generate recommendations for placement and configuration of access point devices within the indoor environment.
Figure 9B:
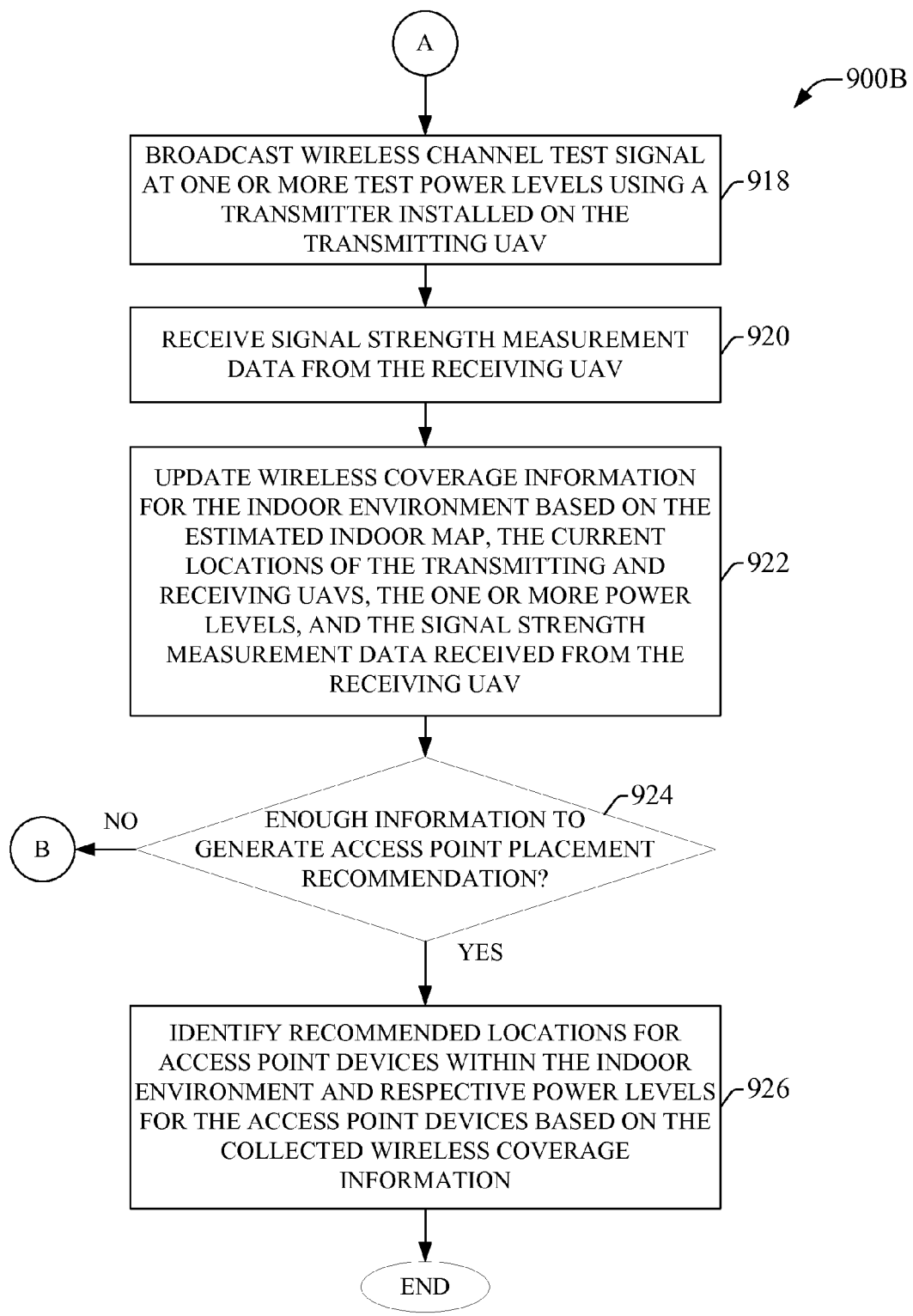
FIG. 9B is a second part of the flowchart of the example methodology for autonomously or semi-autonomously surveying the indoor environment using collaborative UAVs.
Figure 10:
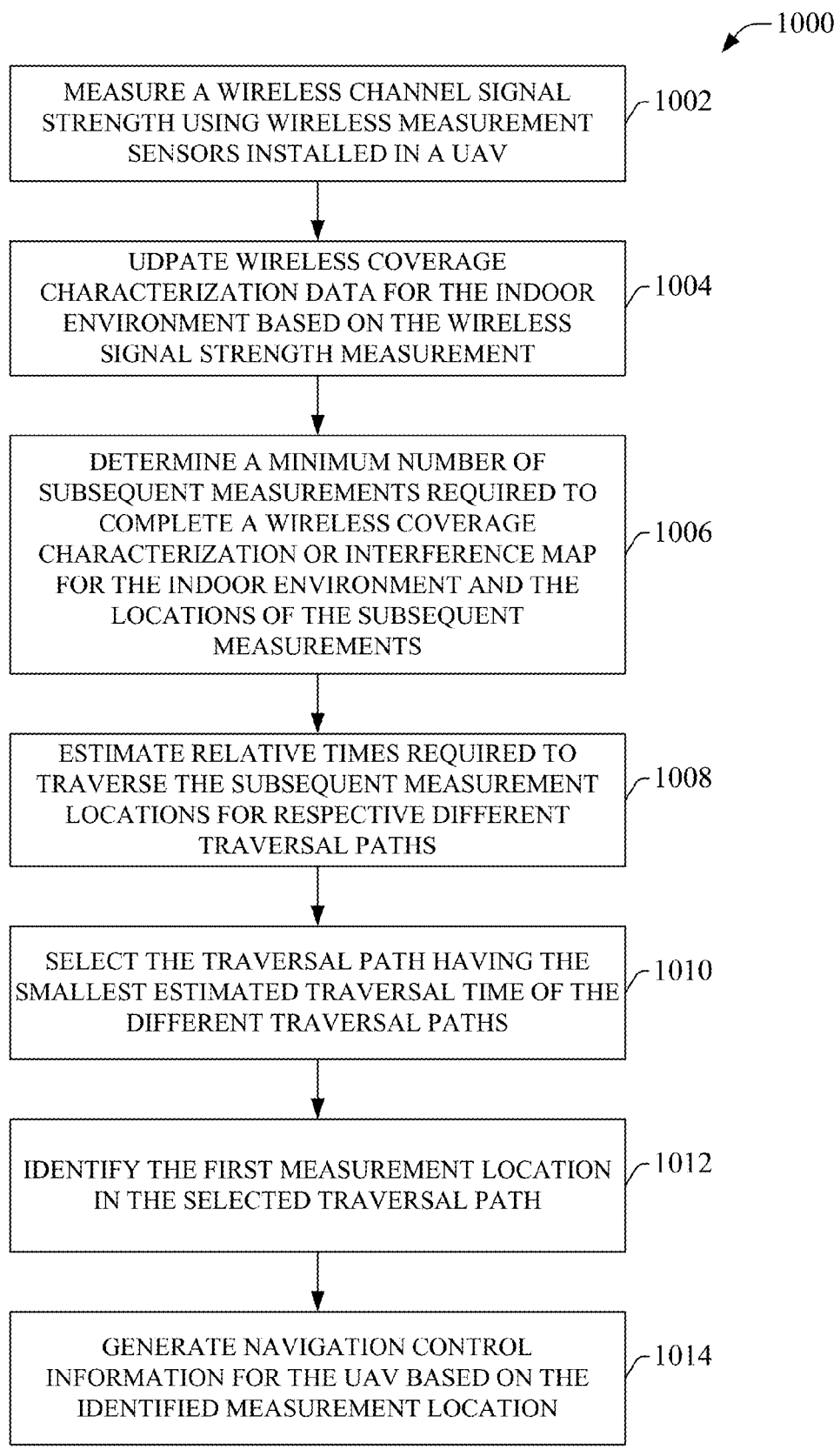
FIG. 10 is a flowchart of an example methodology for dynamically selecting a target destination for a UAV-assisted wireless coverage characterization system during collection of wireless signal measurements.

FIGS. 8-10 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 8 illustrates an example methodology 800 for performing wireless signal measurements and coverage characterization for an indoor environment using one or more UAVs. Initially, at 802, simultaneous localization and mapping (SLAM) measurements are collecting using one or more SLAM sensors installed in a UAV. The UAV may be deployed within an indoor environment for the purpose of performing wireless coverage analysis of the environment. The SLAM sensors may comprise, for example, one or more ultrasonic sensors, laser rangefinders, vision sensors, three-dimensional (3D) image sensors, or other such sensors capable of generating distance, point cloud, or topology information for objects and surfaces in the UAV's surroundings. At 804, an estimated indoor map of the indoor environment is updated based on the SLAM measurements.

At 806, a wireless channel signal strength is measured using one or more wireless measurement sensors installed in the UAV. The wireless channel being measured can be associated with a wireless network established by one or more access point devices located at respective one or more locations throughout the indoor environment. The wireless measurement sensors can obtain, for example, instantaneous channel fading information for the wireless channel, received signal strength indication (RSSI) information for the channel, or other such information that can be used to characterize the strength of the wireless channel at the UAV's current location. At 808, wireless coverage characterization data for the indoor environment is updated based on the wireless signal strength measurement obtained at step 806. In general, the wireless coverage characterization data represents the reliability of wireless access at all locations throughout the indoor environment as a result of the wireless channel signaling transmitted by the one or more access point devices. The wireless coverage characterization data can comprise, for example, heat map data superimposed on the estimated indoor map updated at step 804, where different colors on the heat map represent respective different strength levels of the wireless channel at a given location on the indoor map. Other formats for the wireless coverage characterization data are also within the scope of one or more embodiments of this disclosure.

At 810, a determination is made regarding whether characterization of the wireless coverage throughout the indoor environment is complete. Any suitable criterion can be used to trigger an end to the wireless coverage characterization. For example, if it is determined that (a) the estimated indoor map of the indoor environment is complete (based on a determination that all extreme boundaries of the indoor environment have been discovered and all areas within those boundaries have been measured for walls or other obstructions) and (b) wireless channel measurements have been obtained for all areas within those boundaries, the characterization of the wireless coverage for the indoor environment can be considered complete.

If it is determined at step 810 that wireless coverage characterization is complete, the methodology ends. Alternatively, if it is determined that wireless coverage characterization is not yet complete, the methodology proceeds to step 812, where a location within the indoor environment where a subsequent SLAM or wireless channel signal strength measurement is to be taken is determined. The new measurement location can be determined based on the estimated indoor map, the current location of the UAV within the indoor environment, and the wireless coverage characterization data collected thus far. For example, the system may identify missing portions of the estimated indoor map, or missing wireless channel strength measurements within the estimated indoor map, and select the location of the missing information as the next location to which the UAV should traverse in order to collect the next SLAM and/or wireless signal measurement.

Selection of the next location at which the UAV should collect the next measurement(s) can be based on an algorithm (e.g., path determination algorithm 504) that estimates—based on the estimated indoor map, the current location of the UAV within the indoor environment, and the wireless coverage characterization data collected thus far— how many additional measurements (SLAM and/or wireless signal measurements) are required to complete construction of the signal strength and interference map subject to one or more defined criteria, as well as the locations of these additional measurements. The defined criteria can specify, for example, that the locations of the additional measurements are to be selected such to minimize or substantially minimize the total number of measurements required to complete the wireless coverage characterization map. In another example, the defined criteria can specify that the locations are to be selected to minimize or substantially minimize the total time required to construct the wireless coverage characterization map. The algorithm can then select one of the identified locations for the additional measurements as the next location for the UAV, where the next location is also selected to satisfy the defined criteria. As illustrated in methodology 800, this determination of the UAV's next measurement location is performed after each new update of the wireless coverage characterization data at step 808, so that the locations are selected dynamically as the UAV traverses the area and collects new measurements. This creates a closed-loop wireless signal measurement technique capable of generating a complete wireless coverage characterization map in an efficient manner using minimal wireless signal measurements and/or in a minimal amount of time.

At 814, navigation control information for the UAV is generated based on the determined location and the estimated indoor map. The navigation information can comprise, for example, information specifying a direction of travel, an acceleration, and/or an amount of thrust for traversing along a path determined to place the UAV at the location determined at step 812. The traversal path can be determined based on information recorded in the estimated indoor map, which identifies the topology of the indoor environment (e.g., the floor plan, including location of the walls and other obstructions identified based on the SLAM measurements collected at step 802), such that the UAV's path of travel to the new location does not result in a collision with a wall or other obstruction. The calculated travel path can be dynamically updated as needed during traversal based on new SLAM measurements collected by the UAV en route to the new destination. An example methodology for determining the new location is described below in connection with FIG. 10.

Upon confirmation that the UAV is at the location determined at step 812, the methodology returns to step 802, and steps 802-808 are repeated in order to update the estimated indoor map and/or the wireless coverage characterization data based on SLAM and/or wireless channel strength measurements taken at the UAV's new location. Another determination is then made at step 810 to determine whether characterization of the wireless coverage for the indoor environment is complete. Steps 802-814 repeat until characterization of the wireless coverage for the indoor area is completed, at which time the methodology ends. The wireless coverage characterization data can comprise, for example, a wireless signal strength map of the indoor environment, indications of weak coverage areas within the indoor environment, and/or indications of wireless interferences sources within the indoor environment.

FIG. 9A is a first part of an example methodology 900A for autonomously or semi-autonomously surveying an indoor environment using collaborative UAVs in order to generate recommendations for placement and configuration of access point devices within the indoor environment. Initially, at 902, SLAM measurements are collected using SLAM sensors installed in a transmitting UAV acting as a master device. In the example methodology 900A and 900B, a transmitting UAV is configured as a master device, while a receiving UAV is configured as a slave device. However, it is to be appreciated that the receiving UAV device can be configured as the master device in some embodiments, with appropriate modifications to the methodology 900A and 900B. At 904, indoor map information is received from a receiving UAV acting as a slave device. Information identifying the UAV's present location is also received from the receiving UAV. The information can be received at the transmitting UAV over a wireless communication channel between the transmitting and receiving UAVs.

At 906, an estimated indoor map is updated based on the SLAM measurements collected at step 902 and the indoor map information received from the receiving UAV device. In this regard, the transmitting UAV (acting as the master) can aggregate its local SLAM measurements with the estimated indoor map information received from the receiving UAV, which was generated by the receiving UAV based on SLAM measurements collected at its present location. In this way, the transmitting (master) UAV can quickly build a composite estimated indoor map for the indoor environment.

At 908, a first location for transmission of a wireless channel test signal is determined. The first location represents a test location for an access point, which will be emulated by the transmitting UAV. At 910, a second location for reception of the wireless channel test signal is determined. The second location represents a test location at which the strength of a test signal generated from the first location will be measured. As described in previous examples, the first and second locations can be selected by the master UAV to satisfy one or more defined criteria for minimizing the number of measurements or the amount of time required to collect a sufficient amount of data for determining suitable access point locations.

At 912, an instruction is sent to the receiving UAV to traverse to the second location. The instruction can be sent to the receiving UAV by the transmitting UAV acting as the master device over a wireless channel. At 914, navigation control information for the transmitting UAV is generated based on the first location determined at step 908 and the estimated indoor map. For example, a navigation control component installed on the transmitting UAV can determine a travel path that will cause the transmitting UAV to traverse from its present location to the first location without colliding with any walls or obstacles identified by the estimated indoor map.

At 916, a determination is made regarding whether the receiving UAV is in position at the second location. For example, the transmitting UAV acting as the master device can determine that the receiving UAV is in position based on a confirmation signal received from receiving UAV indicating that it is in position at the first second location. When it is determined at 916 that the receiving UAV is in position, the methodology continues at step 918 of the second part of the methodology 900B in FIG. 9B.

At 918, a wireless channel test signal is broadcast at one or more test power levels using a transmitter installed on the transmitting UAV. This simulates the transmission of a wireless channel by an access point device at the transmitting UAV's present location. At 920, signal strength measurement data is received from the receiving UAV. The signal strength measurement data represents the strength of the broadcasted test signal measured by the receiving UAV at the receiving UAV's present location. The signal strength measurement data may comprise, for example, instantaneous channel fading information for the test signal, received signal strength indication (RSSI) information for the test signal, or other such information. At 922, wireless coverage information for the indoor environment is updated based on the estimated indoor map updated at step 906, the current locations of the transmitting and receiving UAVs, the one or more power levels at which the test signal was transmitted, and the signal strength measurement data received at step 920. The wireless coverage information is a compilation of test signal strength measurements correlated with the transmission/reception location pairs and the transmission power levels for which the measurements were obtained. The system will use this compiled information to determine suitable installation locations for access point devices—as well as suitable transmission power levels for each access point device—that will ensure reliable wireless access at all locations within the indoor environment.

At 924, a determination is made regarding whether enough wireless coverage information has been collected to generate an access point placement recommendation. If it is determined at step 924 that enough wireless coverage information has been collected, recommended locations for access point devices within the indoor environment are identified based on the collected wireless coverage information. In addition, suitable power level settings for the respective access point devices are also identified based on the collected wireless coverage information. These access point location and power level recommendations can be displayed to a user using any suitable means. For example, an interface application running on a separate computing device can interface with the data collection and processing system on the transmitting UAV and display the test results using any suitable format. In some embodiments, the results may be presented as a graphical representation of the indoor map with the recommended locations of the access point devices indicated on the map. The power level recommendations can be displayed as overlays on or near the location indications. Other test result display formats are also within the scope of one or more embodiments of this disclosure.

If it is determined at step 924 that there is not yet enough information to determine suitable access point locations and power levels, the methodology can return to step 902, and steps 902-924 can be repeated. Repeating steps 902-924 will cause the UAVs to traverse to new transmit/receive locations and repeat the test signal measurement at the new locations. The new transmit and receive locations can be selected at steps 908 and 910 using any suitable selection criteria, with the goal of testing the wireless coverage efficiency of various hypothetical access point locations, as well as identifying possible areas of weak wireless coverage associated with the tested access point locations. For example, an algorithm executing on the master UAV can analyze the collected wireless coverage information updated at step 922 and estimate the number and locations of additional measurements required (both transmit and receive locations) to yield enough wireless coverage data for the system to determine suitable locations for access point devices. The algorithm can then select the first and second locations as the respective transmit and receive locations for the next measurement based on the analysis, where the first and second locations are selected to minimize the number of measurements (or the amount of time) required to collect the required amount of measurement data.

FIG. 10 illustrates an example methodology 1000 for dynamically selecting a target destination for a UAV-assisted wireless coverage characterization system during collection of wireless signal measurements. In one or more embodiments, methodology 1000 can be used to carry out step 812 of methodology 800 in order to determine the next measurement location to which the UAV should traverse.

Initially, at 1002, a wireless channel signal strength is measured using one or more wireless measurement sensors installed in a UAV in the process of traversing an indoor environment and generating wireless coverage characterization data for the environment. At 1004, wireless coverage characterization data for the indoor environment is updated based on the wireless signal strength measurement collected at step 1002. At 1006, a determination is made regarding a minimum number of subsequent measurements required to complete a wireless coverage characterization or interference map for the indoor area, as well as the locations of the subsequent measurements. The determination can be based on an estimated indoor map of the indoor environment generated based on SLAM sensor measurements carried out by the UAV, an estimated current location of the UAV within the indoor environment, and the wireless coverage characterization data collected up to the present time. For example, a path determination algorithm implemented by a navigation control component can identify the areas of the indoor environment for which signal measurements have not yet been obtained, and estimate the locations within the indoor environment at which subsequent measurements must be taken in order to obtain the missing measurements.

At 1008, the relative times required to traverse the subsequent measurement locations are estimated for respective different traversal paths through the measurement locations. The different traversal paths can correspond to respective different possible orders in which the subsequent measurement locations can be traversed. At 1010, the traversal path having the smallest estimated traversal time of the different traversal paths analyzed at step 1008 is selected. At 1012, the first measurement location in traversal path selected at step 1010 is identified. At 1014, navigation control information for the UAV is generated based on the measurement location identified at step 1012. In particular, the navigation control information is configured to guide the UAV to the location selected at 1012 in order to collect the next wireless measurement.

Embodiments, systems, and components described herein can include computer or network components such as servers, clients, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Figure 11:
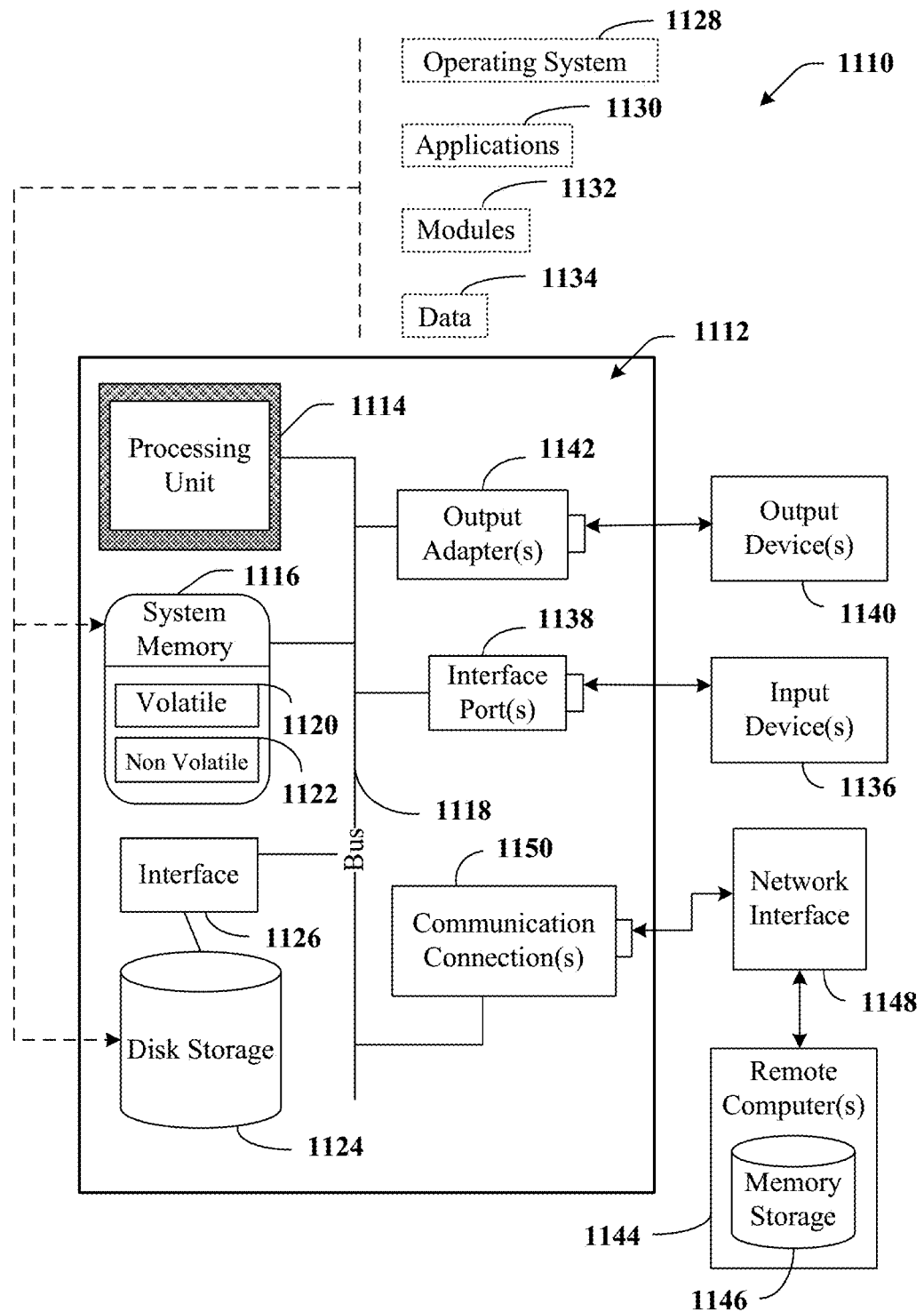
FIG. 11 is an example computing environment.
Figure 12:
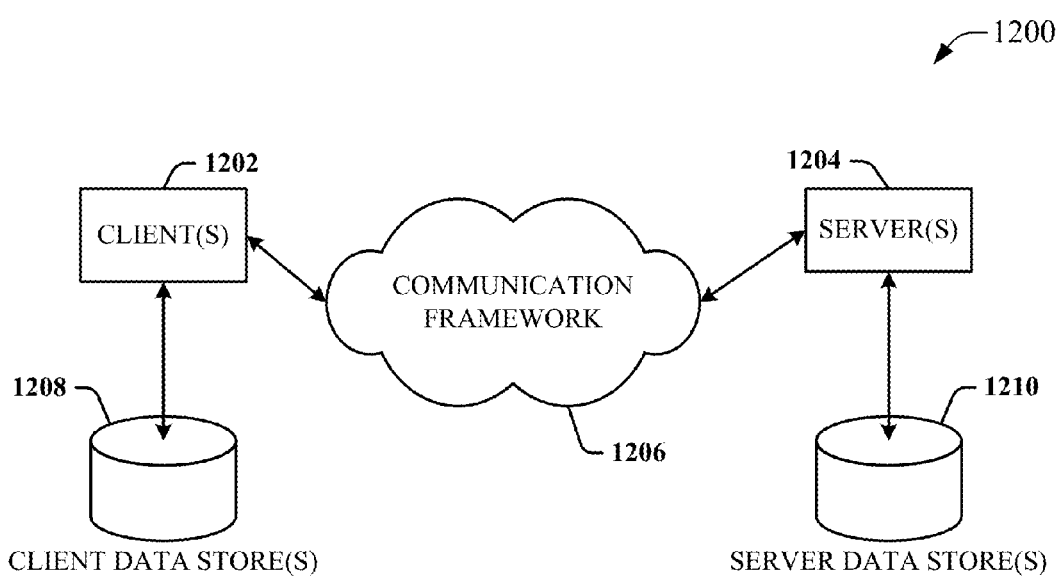
FIG. 12 is an example networking environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, an example environment 1110 for implementing various aspects of the aforementioned subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Multi-core microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable PROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer 1112. System applications 1130 take advantage of the management of resources by operating system 1128 through program modules 1132 and program data 1134 stored either in system memory 1116 or on disk storage 1124. It is to be appreciated that one or more embodiments of the subject disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapters 1142 are provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the system bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample computing environment 1200 with which the disclosed subject matter can interact. The sample computing environment 1200 includes one or more client(s) 1202. The client(s) 1202 can be hardware and/or software (e.g., threads, processes, computing devices). The sample computing environment 1200 also includes one or more server(s) 1204. The server(s) 1204 can also be hardware and/or software (e.g., threads, processes, computing devices). The servers 1204 can house threads to perform transformations by employing one or more embodiments as described herein, for example. One possible communication between a client 1202 and servers 1204 can be in the form of a data packet adapted to be transmitted between two or more computer processes. The sample computing environment 1200 includes a communication framework 1206 that can be employed to facilitate communications between the client(s) 1202 and the server(s) 1204. The client(s) 1202 are operably connected to one or more client data store(s) 1208 that can be employed to store information local to the client(s) 1202. Similarly, the server(s) 1204 are operably connected to one or more server data store(s) 1210 that can be employed to store information local to the servers 1204.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising a memory that stores executable components; and a processor, operatively coupled to the memory, that executes the executable components, the executable components comprising:

a simultaneous localization and mapping component configured to measure topological information for a space within a range of an unmanned vehicle;

a map building component configured to generate, based on the topological information, estimated indoor map data describing a layout of an indoor environment and vehicle location data identifying a first location of the unmanned vehicle within the indoor environment;

a wireless channel measurement component configured to measure a strength of a wireless channel detected at the first location of the unmanned vehicle to yield wireless measurement data;

a wireless coverage characterization component configured to generate wireless coverage characterization data for the indoor environment incrementally based on the wireless measurement data, the estimated indoor map data, and the vehicle location data; and a navigation control component configured to control a navigation path for the unmanned vehicle based on the estimated indoor map data, the vehicle location data, and the wireless coverage characterization data, wherein the navigation control component is further configured to:
  determine which areas of the indoor environment have not been measured based on the wireless coverage characterization data and the estimated indoor map data,
  select a second location within the indoor environment at which a wireless channel measurement is to be taken based on the areas of the indoor environment that have not been measured, and
  determine the navigation path for the unmanned vehicle based on the second location, the estimated indoor map data, and the vehicle location data.

2. The system of claim 1, wherein the unmanned vehicle comprises an unmanned aerial vehicle.

3. The system of claim 1, wherein the wireless coverage characterization data comprises a wireless signal strength map for the indoor environment.

4. The system of claim 3, wherein the navigation control component is configured to control the navigation path to direct the unmanned vehicle to the second location based on the topological information, the wireless measurement data, and the wireless coverage characterization data.

5. The system of claim 1, wherein the wireless coverage characterization data at least one of identifies one or more areas within the indoor environment for which wireless channel strength is below a defined minimum strength level or identifies one or more locations of wireless interference sources within the indoor environment.

6. The system of claim 5, wherein the wireless coverage characterization component is further configured to generate recommendation data identifying a recommended location of an access point device and a recommended configuration setting for the access point device determined to decrease the one or more areas within the indoor environment for which the wireless channel strength is below the defined threshold.

7. The system of claim 1, wherein the executable components further comprise a communication component configured to receive, via a wireless connection, other topological information from another unmanned vehicle and other location data indicating a third location of the other unmanned vehicle, wherein the map building component is configured to update the estimated indoor map data based on the other topological information and the other location data.

8. The system of claim 7, wherein the communication component is further configured to receive other wireless measurement data from the other unmanned vehicle, and wherein the wireless channel coverage characterization component is configured to update the wireless coverage characterization data incrementally based on the other wireless measurement data to yield updated wireless coverage characterization data.

9. The system of claim 1, wherein the navigation component is configured to generate at least one of a direction signal, a thrust signal, or an acceleration signal for the unmanned vehicle based on the estimated indoor map data, the vehicle location data, and the wireless coverage characterization data.

10. A method, comprising:
  measuring, by a system comprising at least one processor, topology data for a portion of an indoor environment within a sensing range of an unmanned vehicle;
  creating, by the system based on the topology data, estimated indoor map data representing a map of the indoor environment and vehicle location data representing a location of the unmanned vehicle within the indoor environment;
  measuring, by the system, a strength of a wireless communication signal at the location of the unmanned vehicle to yield wireless measurement data;
  creating, by the system, wireless coverage characterization data for the indoor environment based on the wireless measurement data, the estimated indoor map data, and the vehicle location data; and
  controlling, by the system, a navigation path of the unmanned vehicle based on the estimated indoor map data, the vehicle location data, and the wireless coverage characterization data, wherein the controlling comprises at least:
    determining at least one area of the indoor environment that has not been measured based on the wireless coverage characterization data and the estimated indoor map data,
    selecting another location within the indoor environment at which a wireless channel measurement is to be taken based on the at least one area of the indoor environment that has not been measured, and
    determining the navigation path for the unmanned vehicle based on the other location, the estimated indoor map data, and the vehicle location data.

11. The method of claim 10, wherein the creating the wireless coverage characterization data comprises generating a wireless signal strength map for the indoor environment incrementally based as the wireless measurement data is incrementally measured.

12. The method of claim 11, wherein the controlling the navigation path further comprises:
  controlling the navigation path to direct the unmanned vehicle to the other location based on the estimated indoor map and the vehicle location data.

13. The method of claim 10, wherein the creating the wireless coverage characterization data comprises at least one of
  identifying one or more portions of the indoor environment at which the strength of the wireless communication signal is below a defined minimum strength, or
  identifying one or more locations of wireless interference sources within the indoor environment.

14. The method of claim 10, further comprising:
  receiving, by the system via a wireless connection, other topology data from another unmanned vehicle and other location data identifying another location of the other unmanned vehicle; and
  updating, by the system, the estimated indoor map data based on the other topology information and the other location data.

15. The method of claim 14, further comprising:
  receiving, by the system via the wireless connection, other wireless measurement data from the other unmanned vehicle; and
  updating, by the system, the wireless coverage characterization data based on the other wireless measurement data.

16. The method of claim 10, wherein the controlling the navigation path further comprises generating at least one of a direction signal, a thrust signal, or an acceleration signal for the unmanned vehicle based on the estimated indoor map data, the vehicle location data, and the wireless coverage characterization data.

17. An unmanned vehicle, comprising:
a processor; and
a memory that stores executable instructions that, in response to execution by the processor, facilitate performance of operations, comprising:
   measuring a topology of a space within a sensing range of the unmanned vehicle;
   generating topology data based on the measuring;
   generating estimated indoor map data based on the topology data, wherein the estimated indoor map data represents an obstruction map of the indoor environment;
   generating vehicle location data based on the topology data, wherein the vehicle location data identifies a first location of the unmanned vehicle within the indoor environment;
   measuring a strength of a wireless communication channel at the first location of the unmanned vehicle to yield wireless measurement data;
   generating wireless coverage characterization data for the indoor environment based on the wireless measurement data, the estimated indoor map data, and the vehicle location data; and
   controlling a navigation path of the unmanned vehicle based on the estimated indoor map data, the vehicle location data, and the wireless coverage characterization data, wherein the controlling comprises at least:
      determining an area of the indoor environment that has not been measured based on the wireless coverage characterization data and the estimated indoor map data,
      selecting a second location within the indoor environment at which a wireless channel measurement is to be taken based on the area of the indoor environment that has not been measured, and
      determining the navigation path for the unmanned vehicle based on the second location, the estimated indoor map data, and the vehicle location data.

18. The unmanned vehicle of claim 17, wherein the generating the wireless coverage characterization data comprise incrementally generating a wireless signal strength map for the indoor environment as the wireless measurement data is measured.

19. The unmanned vehicle of claim 17, wherein the controlling the navigation path further comprises:
   controlling the navigation path to direct the unmanned vehicle to the second location based on the estimated indoor map data and the vehicle location data.

20. The system of claim 8, wherein
   the navigation component is further configured to select, based on the updated wireless coverage characterization data, a fourth location at which the other unmanned vehicle is to take another wireless channel measurement, and
   the communication component is further configured to send an instruction to the other unmanned vehicle to traverse to the fourth location.

* * * * *